United States Patent
Strom

(10) Patent No.: US 8,515,187 B2
(45) Date of Patent: Aug. 20, 2013

(54) METHOD, COMPRESSOR, DECOMPRESSOR AND SIGNAL REPRESENTATION FOR LOSSLESS COMPRESSION OF PIXEL BLOCK VALUES USING ROW AND COLUMN SLOPE CODEWORDS

(75) Inventor: Jacob Strom, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 447 days.

(21) Appl. No.: 12/681,191

(22) PCT Filed: Oct. 3, 2007

(86) PCT No.: PCT/SE2007/050705
§ 371 (c)(1),
(2), (4) Date: Apr. 1, 2010

(87) PCT Pub. No.: WO2009/045133
PCT Pub. Date: Apr. 9, 2009

(65) Prior Publication Data
US 2011/0268367 A1    Nov. 3, 2011

(51) Int. Cl.
*H04N 7/50* (2006.01)
(52) U.S. Cl.
USPC ............................ 382/232; 382/233; 382/244
(58) Field of Classification Search
USPC ................. 382/232, 244, 233; 345/419, 427, 345/555, 566; 375/240.26, E7.13
See application file for complete search history.

(56) References Cited

U.S. PATENT DOCUMENTS

| 4,945,500 | A | 7/1990 | Deering |
| 6,407,741 | B1 | 6/2002 | Morein et al. |
| 6,476,811 | B1 * | 11/2002 | DeRoo et al. ................. 345/427 |
| 7,830,966 | B2 * | 11/2010 | Kagechi et al. .......... 375/240.26 |
| 2005/0206647 | A1 | 9/2005 | Xu et al. |
| 2007/0285417 | A1 | 12/2007 | Prokopenko et al. |

FOREIGN PATENT DOCUMENTS

| EP | 1 081 649 A2 * | 3/2001 |
| GB | 2207840 A | 2/1989 |

OTHER PUBLICATIONS

Hasselgren, J. et al. "Efficient Depth Buffer Compression." Lund University, 2006.

* cited by examiner

*Primary Examiner* — Anh Do
(74) *Attorney, Agent, or Firm* — Coats & Bennett, P.L.L.C.

(57) ABSTRACT

The invention relates to compression of a pixel block (300) of depth values. A reference codeword (410) is determined as a representation of a reference depth value. A row (420) and a column (430) slope codeword are determined as representations of a basic depth slope for the rows (310) and columns (320) in the block (300), respectively. Representations indicating pixel positions where a slope change occurs along at least a portion of a row (310) or column (320) is determined for at least a subset of the rows (310) or columns (320). A mode codeword (440) is determined as a representation of a set of multiple slope correction patterns. A respect pattern codeword (450) is then selected for rows (310) or columns (320) as identifier of one of the slope correction patterns.

33 Claims, 15 Drawing Sheets

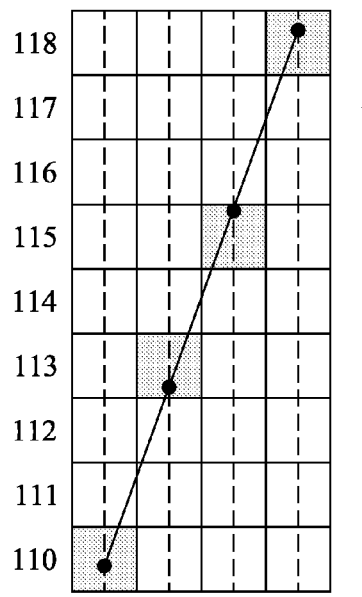
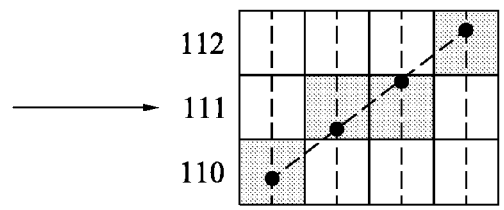
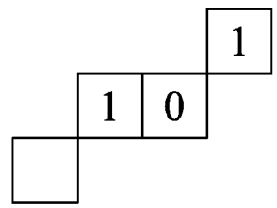
Fig. 5A
Fig. 5B
Fig. 5C
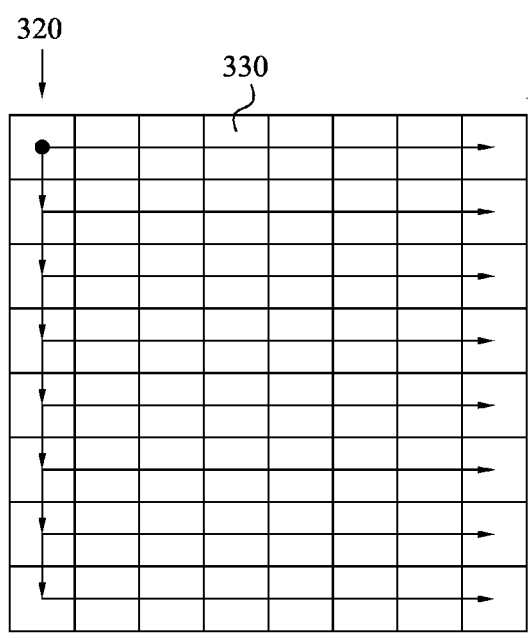
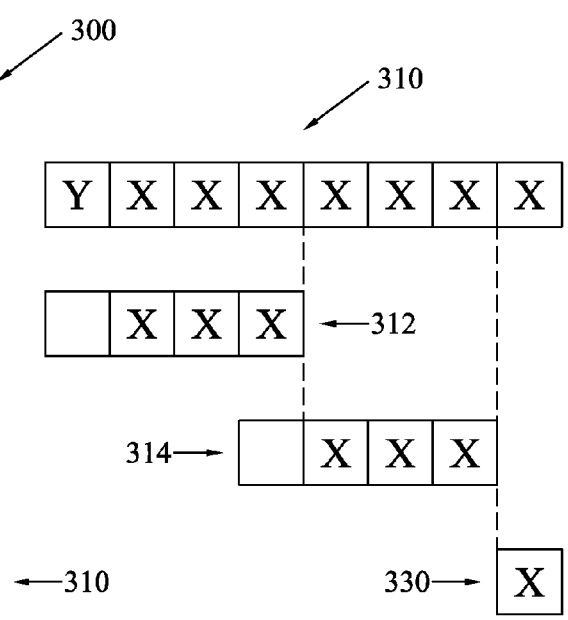
Fig. 7A
Fig. 7B

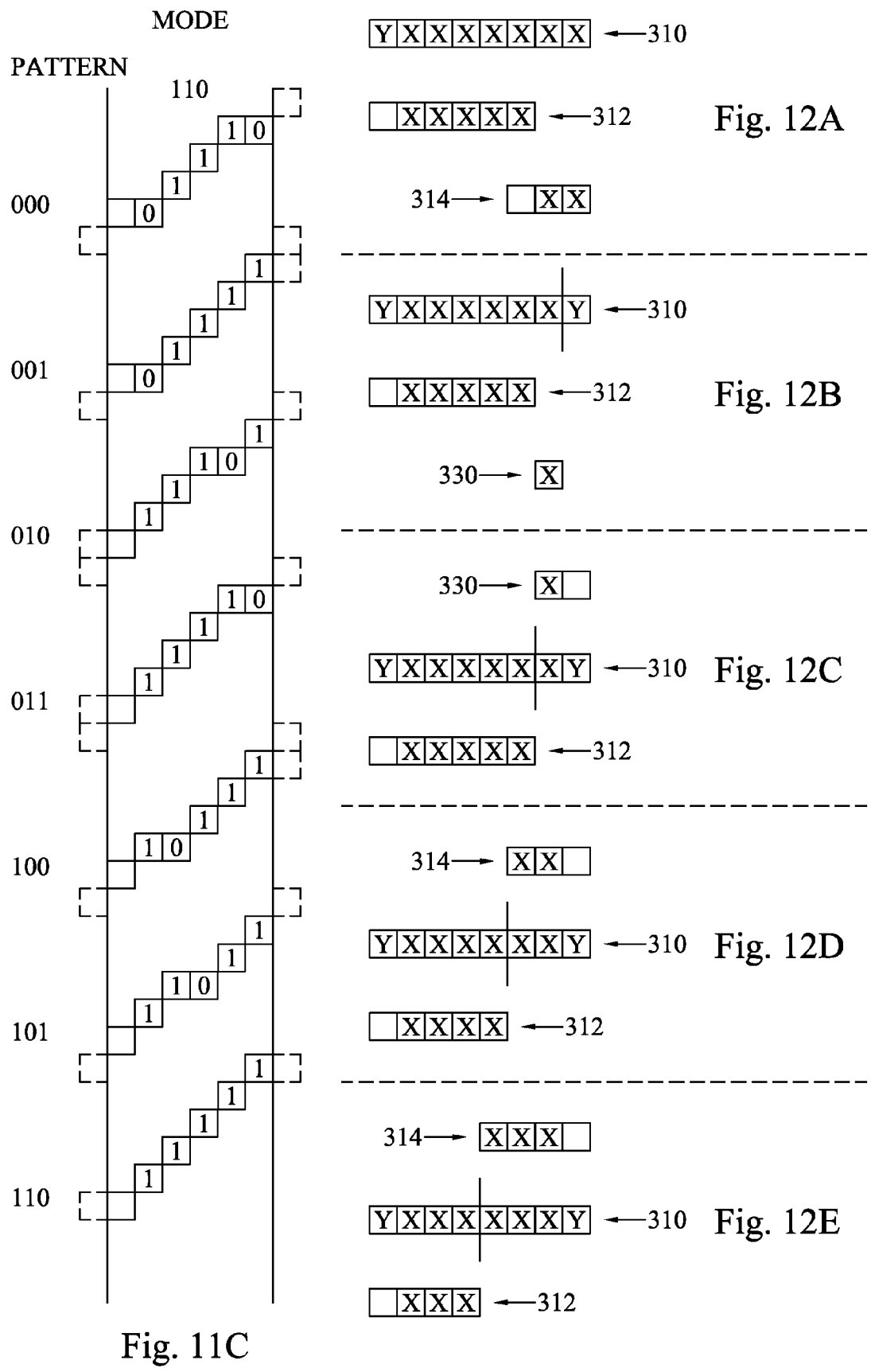

METHOD, COMPRESSOR, DECOMPRESSOR AND SIGNAL REPRESENTATION FOR LOSSLESS COMPRESSION OF PIXEL BLOCK VALUES USING ROW AND COLUMN SLOPE CODEWORDS

TECHNICAL FIELD

The present invention generally relates to a lossless compression and decompression of pixel parameter values, and in particular such a compression and decompression suitable for depth buffer compression and decompression.

BACKGROUND

The real-time rendering of three-dimensional graphics has a number of appealing applications on mobile terminals, including games, man-machine interfaces, messaging and m-commerce. Since three-dimensional rendering is a computationally expensive task, dedicated hardware must often be built to reach sufficient performance. Innovative ways of lowering the complexity and bandwidth usage of this hardware architecture are thus of great importance. The main bottleneck, especially for mobile terminals, is memory bandwidth. A common technique for reducing memory bandwidth usage is depth buffer compression.

Primitives, such as triangles, are usually drawn in a non-sorted order. In order to make sure that only the triangles that are closest to the eye are written, a depth buffer is generally used. The depth buffer holds, for each pixel, the depth, i.e. distance to the eye, for that particular pixel. Before writing a new pixel, the corresponding depth is first read from the depth buffer. The new pixel is only written if the new depth is smaller than the previously written depth. The new depth value must then be written to the depth buffer. This reading and writing of depth values will generate a lot of memory accesses, which limits performance.

Depth buffer compression works by dividing the depth buffer into tiles or pixel blocks, and storing the tiles in a compressed format. When reading a depth buffer value, the entire depth tile is read and decompressed. The depth values are then modified, and before writing the tile to memory again, it is compressed. Since rasterization is usually done on a per-tile basis, it is often not a problem to read and write an entire tile at once instead of reading and writing on a per-pixel basis.

Since this decompression and compression might happen several times for a particular tile, it is important that the compression is lossless, i.e. non-destructive.

The depth buffer contains the depth of each pixel, and since the scene is made up of planar triangles, all pixels in a tile that stems from a certain triangle will be collinear. In particular, if all pixels in a tile come from the same triangle, all pixels in the tile will be collinear. In such a case, it will be possible to obtain a lossless representation of the tile by just storing the plane equation of the triangle in question, instead of storing the individual pixel depths. Many depth buffer algorithms work this way. Hasselgren and Akenine-Möller provide an extensive review of the known depth buffer compression schemes in their paper [1].

Hasselgren and Akenine-Möller also present, in the paper [1], an improvement of the prior art schemes that use differential pulse code modulation (DDPCM). Their key contribution is that, instead of using a correction value of $\{-1, 0, 1\}$, it is possible to get by with only one bit per pixel. The discovery that they made is that, since the slope in the x-direction is alternating between two values, it is always possible to use the smaller slope and then use a 1-bit correction value for the slope per pixel.

Compared to the previous DDPCM schemes, where the correction values are one of $\{-1, 0, 1\}$, and thus use two bits per pixel to encode, Hasselgren and Akenine-Möller use a one-bit-per-pixel correction value, thus saving one bit per pixel. This translates to 13 bits saved in a tile of 4×4 pixels, or 61 bits saved for an 8×8 tile. However, even with this bit savings Hasselgren and Akenine-Möller are only able to compress about 93% of the possible depth range in a lossless way. If an object comes too close to the camera or viewer, the depth buffer compression algorithm will fail and the depth tiles must be stored uncompressed.

SUMMARY

There is therefore a need of being able to exploit the bits of compressed tiles in a more efficient manner in order to be able to increase the number of tiles that can be compressed in a lossless way, which would lead to lowered memory bandwidth.

The present invention overcomes these and other drawbacks of the prior art arrangements.

It is a general object of the present invention to provide an efficient compression and decompression of pixel blocks.

It is another object of the invention to provide a compression and decompression adapted for depth buffer values.

These and other objects are met by the invention as defined by the accompanying patent claims.

Briefly, the present invention involves compression and decompression of blocks of pixels having associated pixel parameter values, such as depth buffer values. The compression involves determining a reference codeword as a representation of a reference pixel parameter value for the block. A row slope codeword is determined as a representation of a basic parameter slope for the rows in the block. Correspondingly, the compression involves determining a column slope codeword as representation of a basic parameter slope for the columns.

A representation indicating pixel positions where a slope change occurs along at least a portion of a row/column is determined based on at least a portion of the pixel parameter values of the row/column. Such a representation is generated for multiple rows/columns in the block, preferably for all rows/columns. A mode codeword that is a representation of a set of multiple slope correction patterns is determined. Each such correction pattern is a specific, predefined representation indicating position-dependent slope correctors applicable along a row/column. A respective pattern codeword is selected for rows/columns based on the generated position-indicating representations. The pattern codewords are representations of slope correction patterns from the pattern set defined by the mode codeword.

In the decompression of a compressed block, a reference pixel parameter value is determined based on the reference codeword in the compressed block. A basic parameter slope, such as row and/or column parameter slope, is generated based on a (row and/or column) slope codeword. The mode codeword in the compressed block is employed for providing a pattern set comprising multiple slope correction patterns. A row/column comprising a pixel to be decoded has an associated pattern codeword. This pattern codeword is used for identifying one of the slope correction patterns of the provided pattern set. The pixel parameter value of the pixel can then be calculated using the reference parameter value, the basic parameter slope and the slope correction pattern.

The present invention also relates to a compressor and decompressor for compressing pixel blocks and decompressing compressed block, respectively, and a signal representation of a compressed pixel block.

SHORT DESCRIPTION OF THE DRAWINGS

The invention together with further objects and advantages thereof, may best be understood by making reference to the following description taken together with the accompanying drawings, in which.

Figure 6:
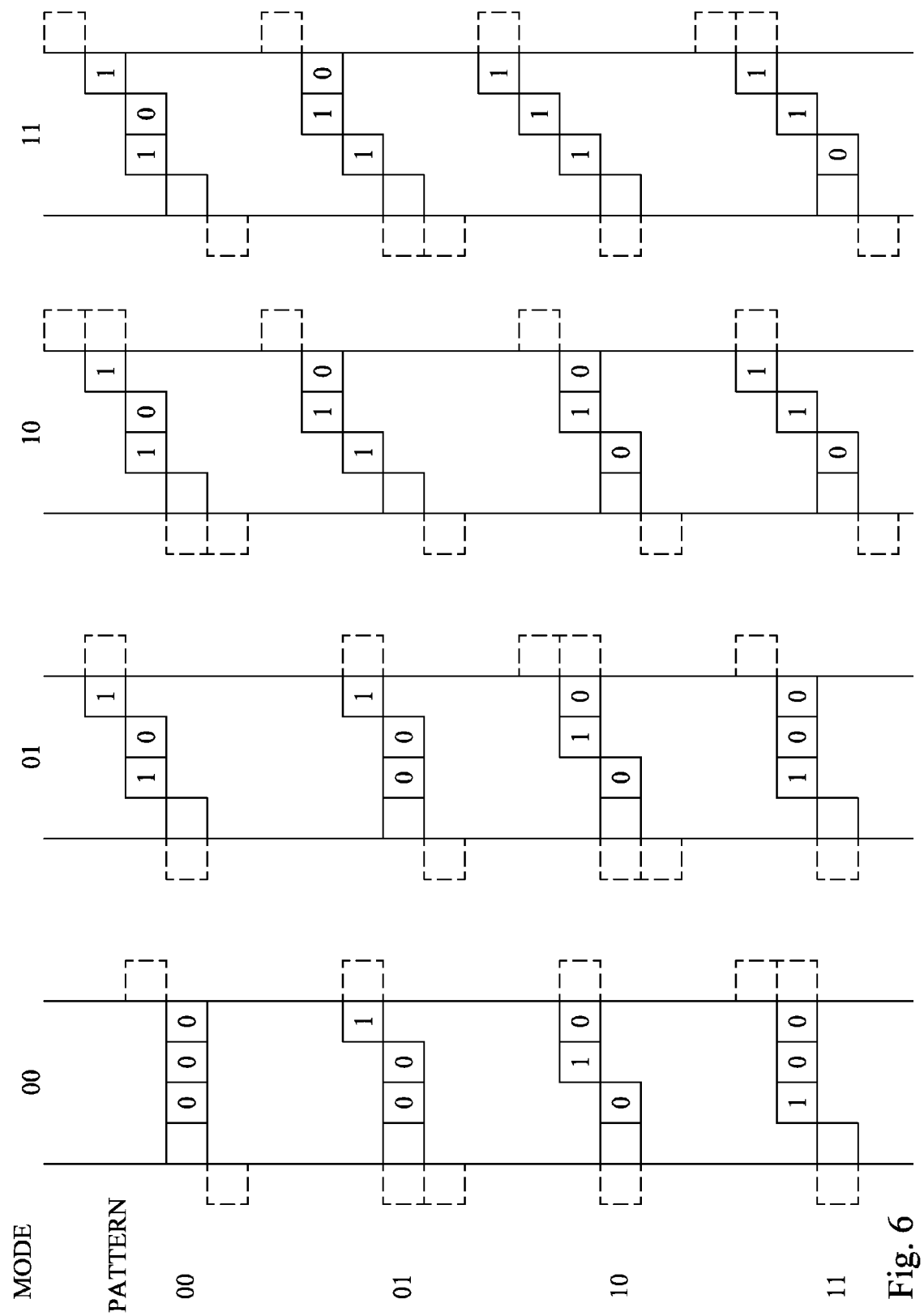
Figure 9:
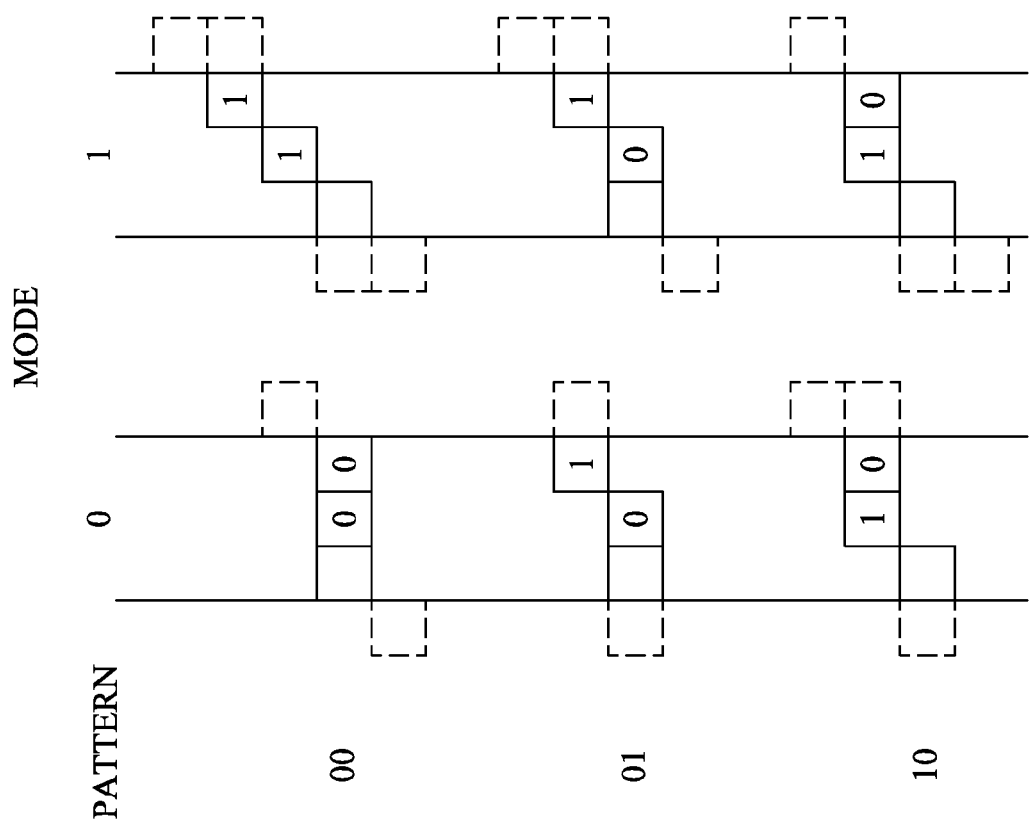
Figure 8:
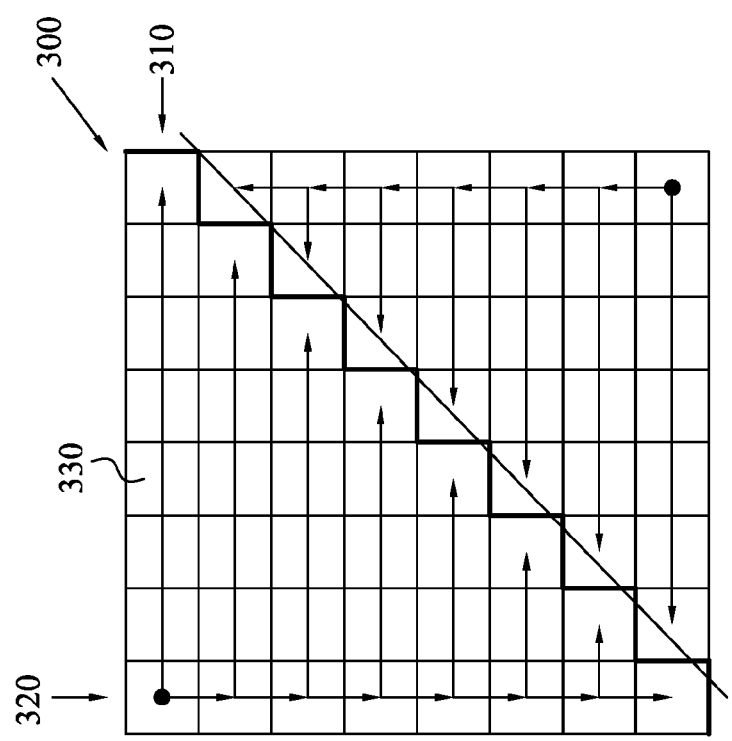
Figure 10:
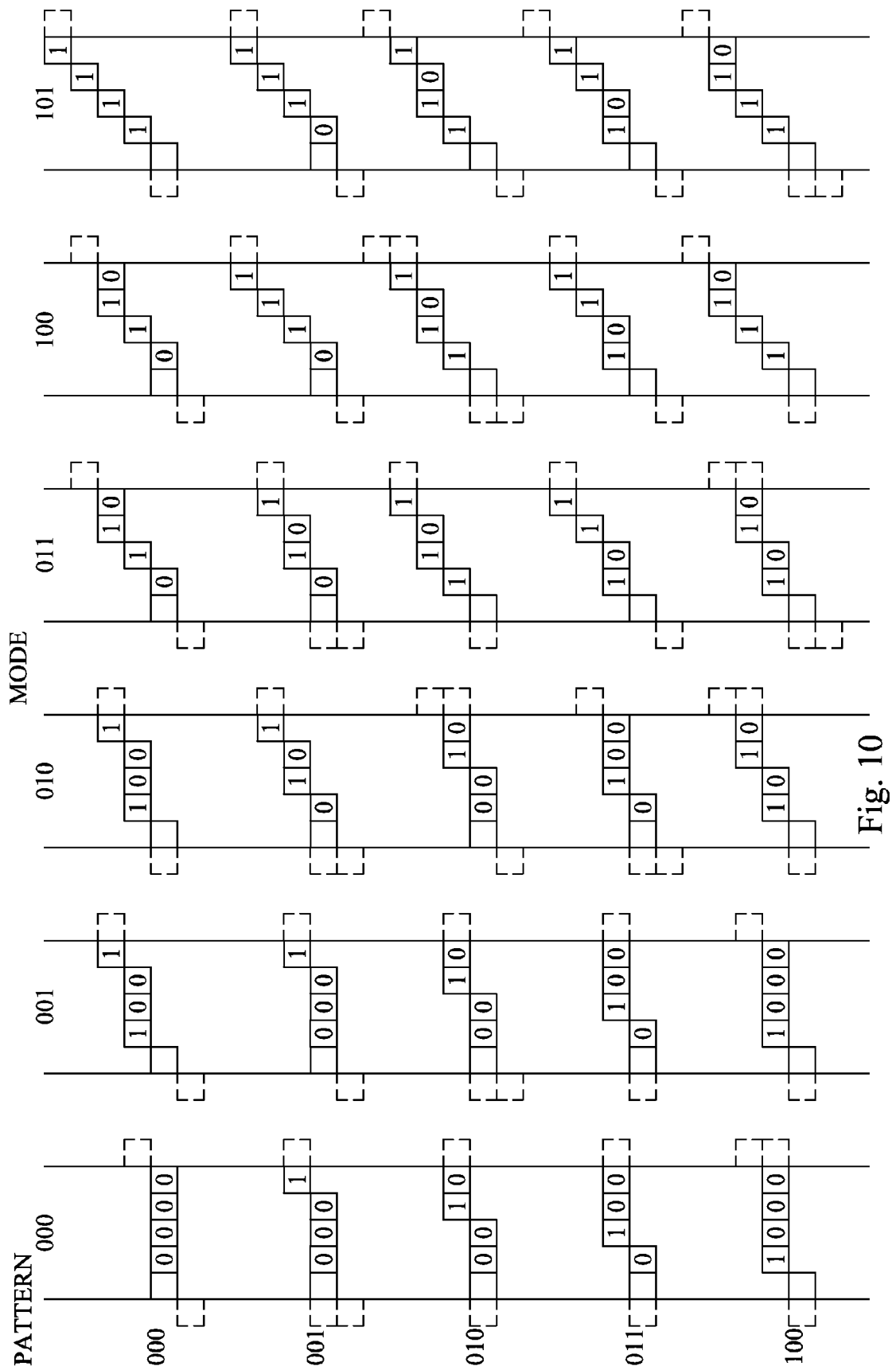
Figure 11A:
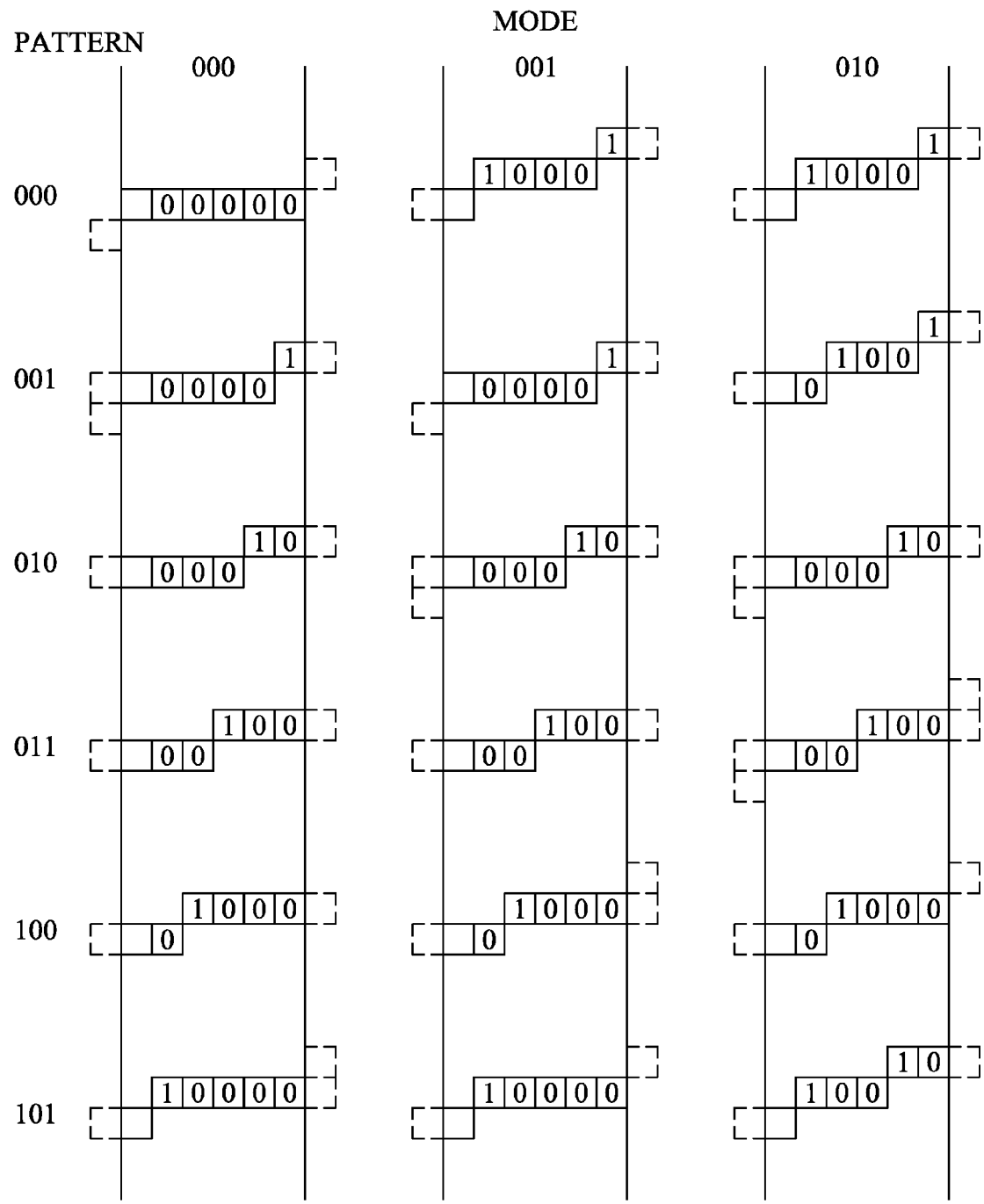
Figure 11B:
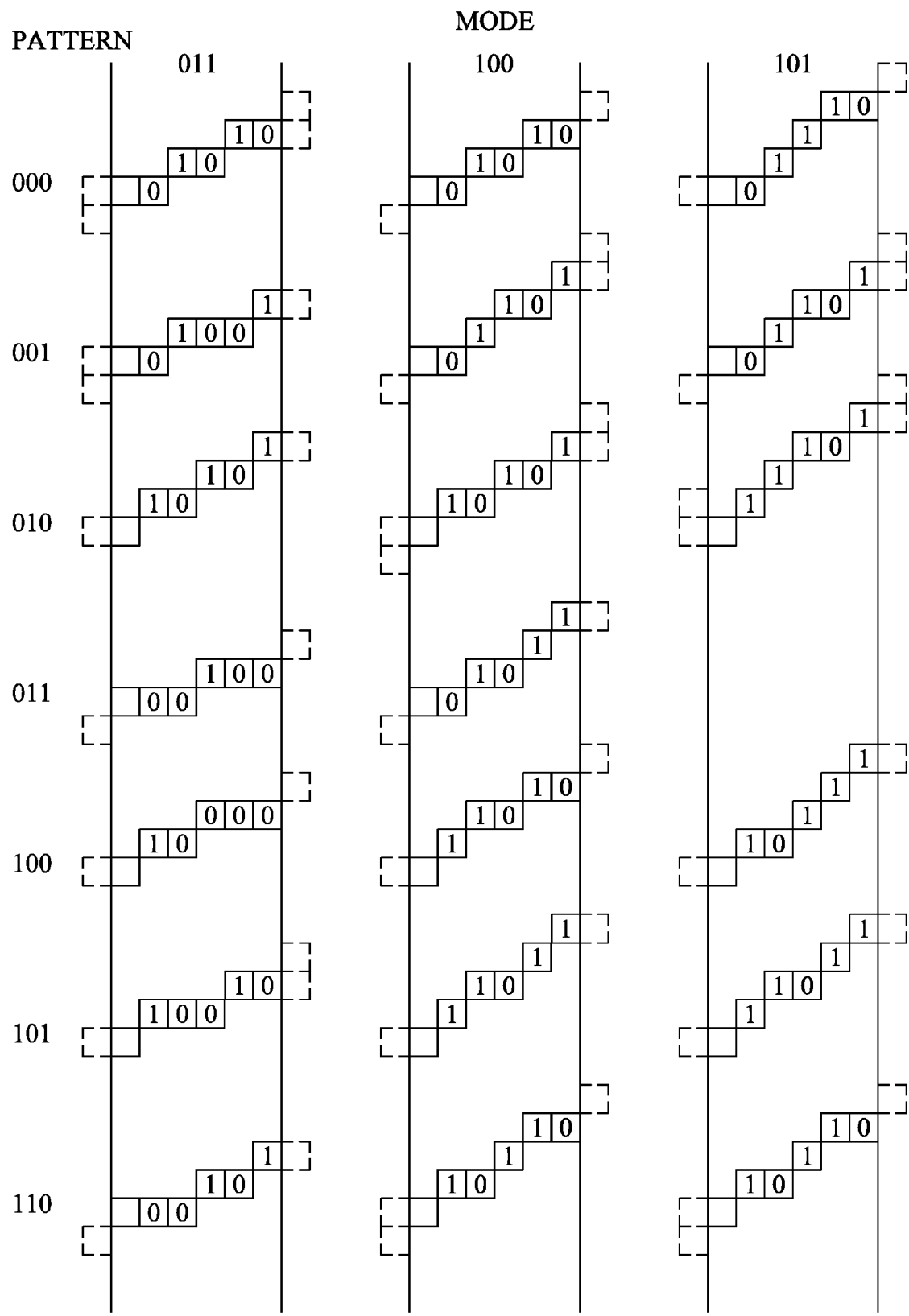
Figure 13:
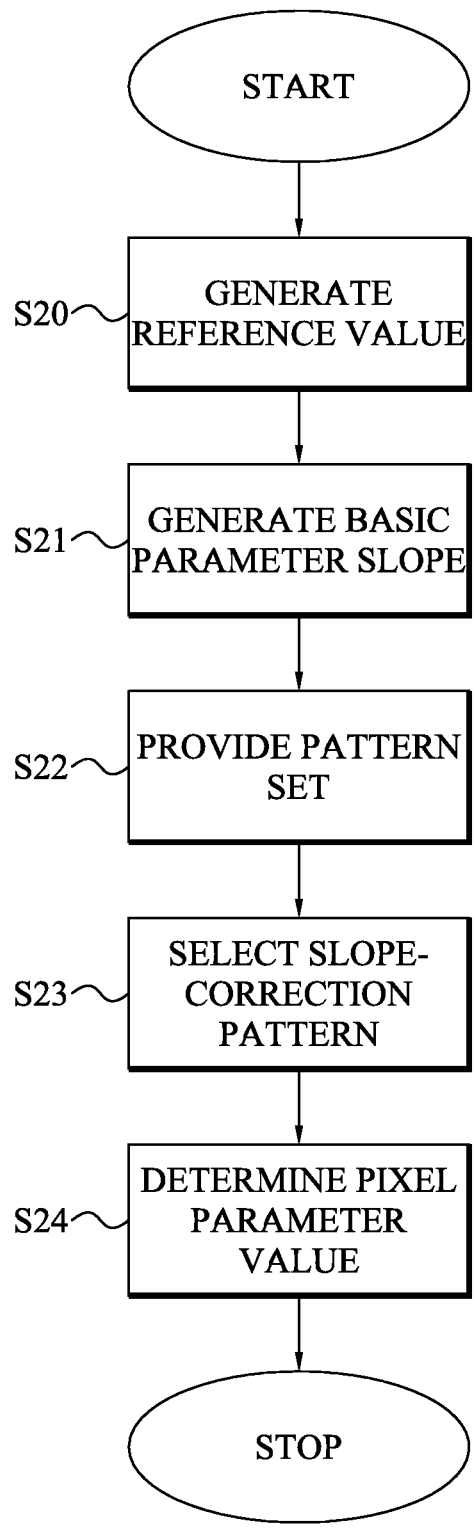
Figure 14:
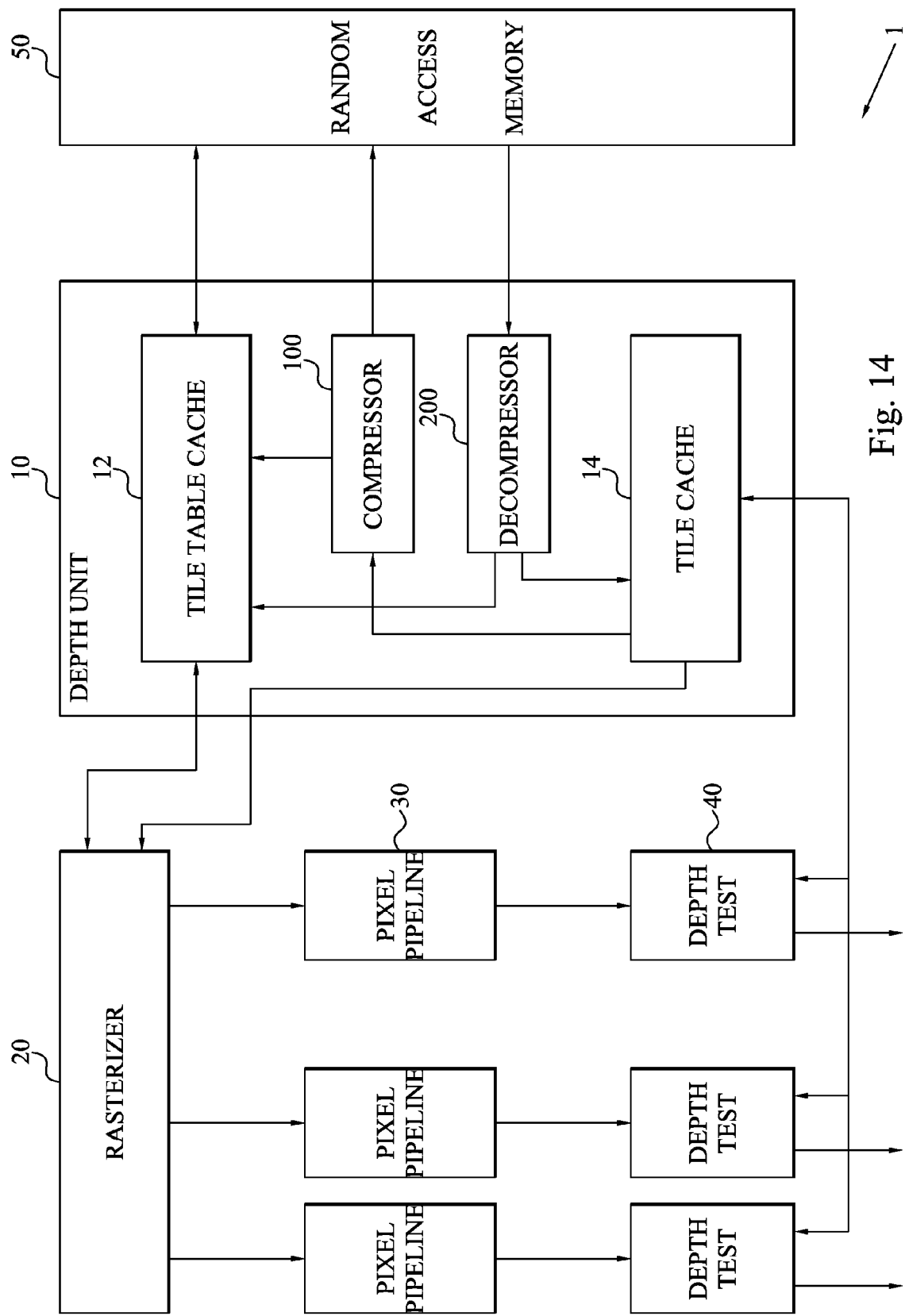
Figure 15:
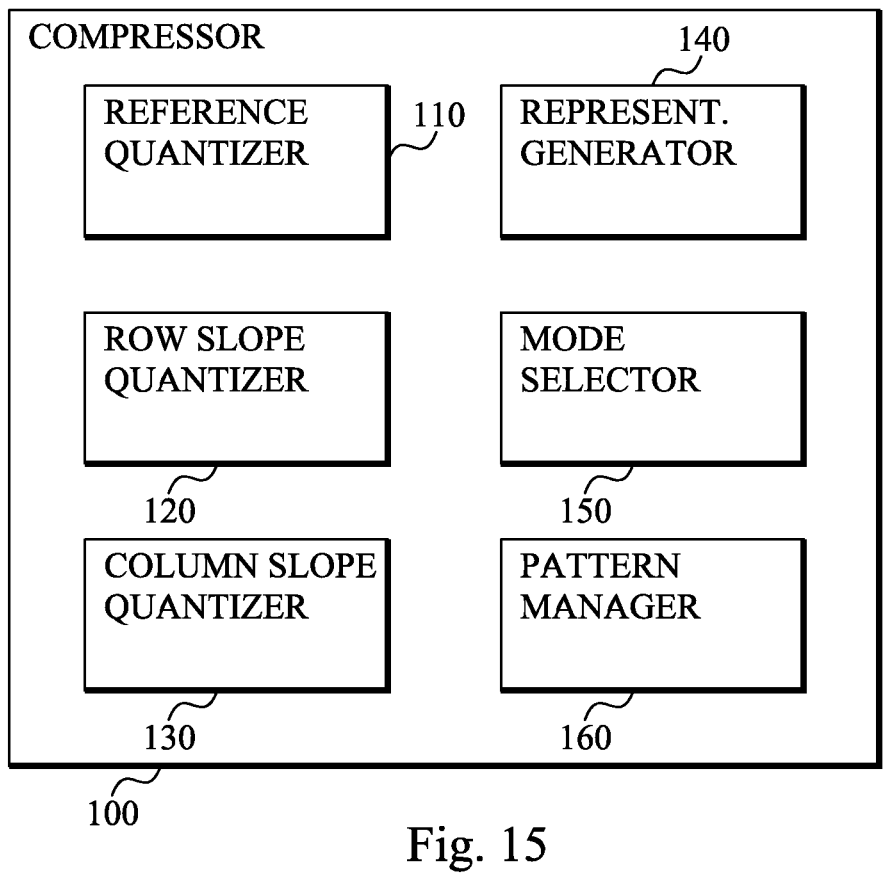
Figure 16:
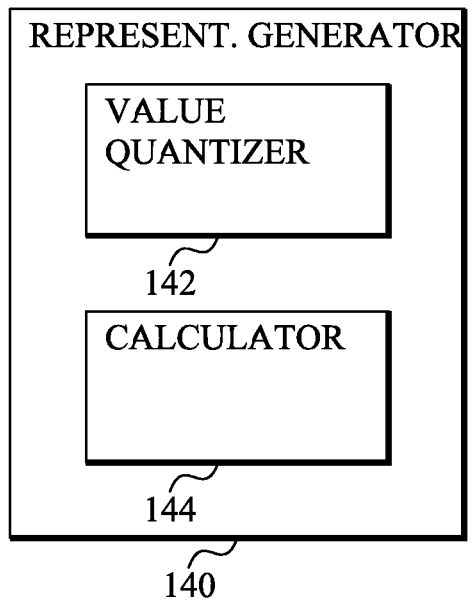
Figure 17:
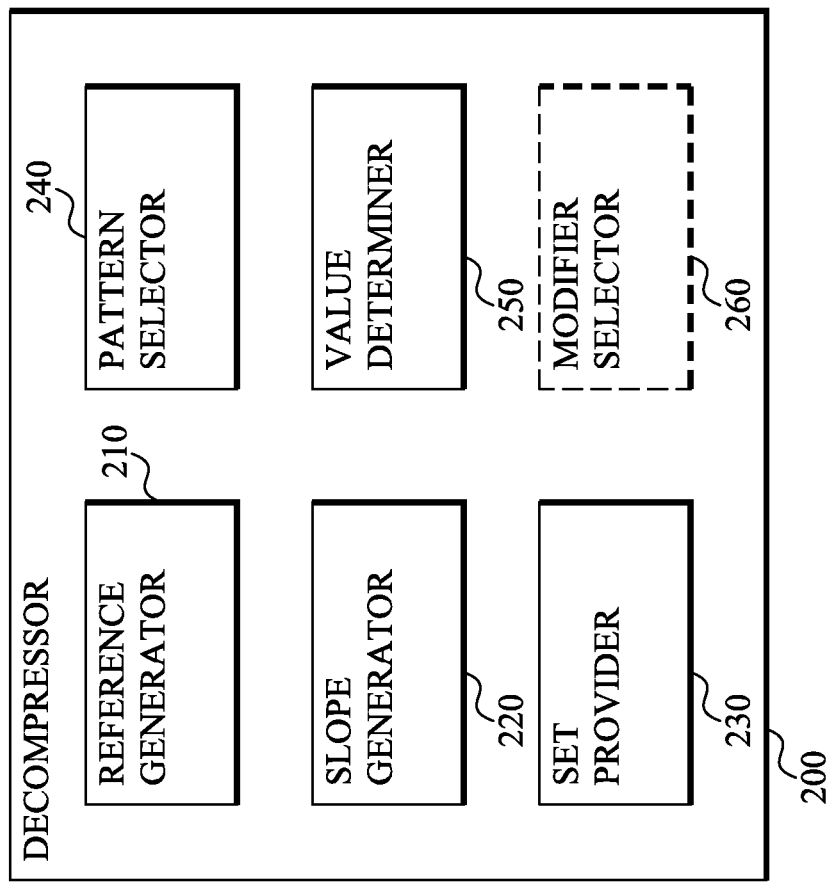

FIGS. 5A to 5C schematically illustrate an embodiment of generating distribution representations in the compression method of the present invention;

FIG. 6 illustrates available sets of predefined distribution patterns used according to the present invention;

FIG. 7A illustrates another pixel block that can be used according to the present invention;

FIG. 7B schematically illustrates an embodiment of handling a row of pixels in the compression method of the present invention for a pixel block illustrated in FIG. 7A;

FIG. 8 illustrates a pixel block comprising two planes;

FIG. 9 illustrates other available sets of predefined distribution patterns used according to the present invention;

FIG. 10 illustrates further available sets of predefined distribution patterns used according to the present invention;

FIGS. 11A to 11C illustrate yet other available sets of predefined distribution patterns used according to the present invention;

FIGS. 12A to 12E schematically illustrate embodiments of handling a row of pixels in the compression method of the present invention for a pixel block illustrated in FIG. 10;

FIG. 13 is a flow diagram of a decompression method according to an embodiment of the present invention;

FIG. 14 a schematic block diagram of a depth buffer architecture to which the teachings of the present invention can be applied;

FIG. 15 is a schematic block diagram of a compressor according to an embodiment of the present invention;

FIG. 16 is a schematic block diagram of a representation generator of the compressor according to an embodiment of the present invention;

FIG. 17 is a schematic block diagram of a decompressor according to an embodiment of the present invention; and FIGS. 18A to 18M illustrate examples of possible distribution patterns used according to the present invention for 8-pixel row or column implementations.

DETAILED DESCRIPTION

Throughout the drawings, the same reference characters will be used for corresponding or similar elements.

The present invention generally relates to a lossless compression and decompression of pixel parameter values, and in particular such a compression and decompression suitable for depth buffer compression and decompression.

The present invention is well adapted for usage with three-dimensional (3D) graphics, such as games, 3D maps and scenes, 3D messages, e.g. animated messages, screen savers, man-machine interfaces (MMIs), etc., but is not limited thereto. Thus, the invention could also be employed for encoding other types of images or graphics, e.g. one-dimensional (1D), two-dimensional (2D) or 3D images.

In the present invention, the compression and decompression collectively handles a plurality of pixels, typically in the form of a block or a tile of pixels. In a preferred embodiment of the invention, a pixel block has the size of M×N pixels, where M, N are integer numbers with the proviso that both M and N are not simultaneously one. Preferably, $M=2^m$ and $N=2^n$, where m, n are zero or integers with the proviso that m and n are not simultaneously zero. In a typical implementation M=N and preferred such block embodiments could be 4×4 pixels, 8×8 pixels or 16×16 pixels.

The expression pixel or "image element" refers to an element in a block or encoded representation of a block. This block, in turn, corresponds to a portion of an image, texture or buffer. Thus, according to the invention, an image element could be a texel (texture element) of a (1D, 2D, 3D) texture, a pixel of a (1D or 2D) image or a voxel (volume element) of a 3D image. Generally, a pixel is characterized with an associated pixel parameter value or feature. In a preferred embodiment of the present invention, the pixel parameter value is a depth value or so-called Z value. This feature represents the depth or distance to the eye for the particular pixel and controls which pixels that will actually be displayed during rendering.

Even though the present invention is particularly suitable for compressing and decompressing such depth values of pixel blocks, the invention is not limited thereto and may be used in connection with other types of pixel parameter values and features. These include color component values, such as red (R), green (G) or blue (B) color components, or a color component in some other color space, such as YUV or YCrCb. Further examples include transparency or alpha value of pixels.

However, the compression and decompression is adapted for handling collinear pixel parameter values, i.e. parameter lying in a plane. Thus, the pixel parameter values of a block to be compressed all lie in a single plane in a parameter space or lie in one of a set of multiple planes, typically two planes. This requirement implies that it may be possible to achieve a lossless compression of the pixel block using fewer bits than the original number bits of the pixel parameter values.

Furthermore, in the following, the term "image" is used to denote any 1D, 2D or 3D image or texture that can be encoded and decoded by means of the present invention, including but not limited to bump maps, normal maps, photos, game type textures, text, drawings, high dynamic range images and textures, etc.

Compression

Figure 1:
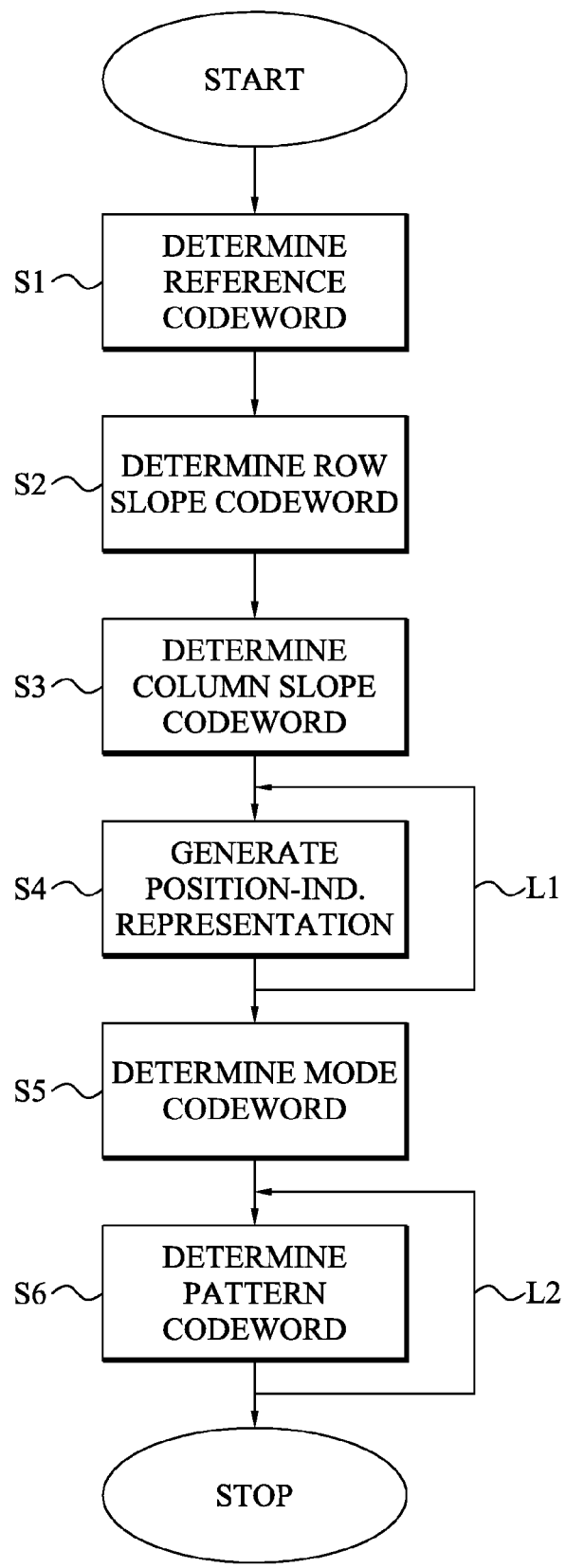
FIG. 1 is a flow diagram of a compression method according to an embodiment of the present invention.

FIG. 1 is a flow diagram illustrating a method of compressing a block of pixels according to the present invention. The method starts in step S1 by determining a reference codeword as a representation of a reference pixel parameter value. This codeword is preferably a representation of one of the pixel parameter values present in the block to be compressed. In a first embodiment, the reference codeword could be an unquantized version of the parameter value. For example, if the particular parameter value is 230=0000 0000 1110 $0110_{bin}$ (with 24-bit resolution) and the reference codeword has the same bit resolution, the value 0000 0000 1110 $0110_{bin}$ can be used directly as reference codeword. However, in other embodiments the original pixel parameter values may have higher precision than can be represented by the reference codeword. In such a case, the reference codeword could be a representation of a quantized or rounded version of the original pixel parameter value. For example, a reference codeword of 0000 0000 1110 0110$_{bin}$ could be used as a representation of an original pixel parameter value of 229.8. Also note that the reference codeword can contain fewer bits than the original pixel parameter value. For instance, a 21-bit codeword could be used for representing a 24-bit original value, while assuming that the leading bits are known.

Figure 2A:
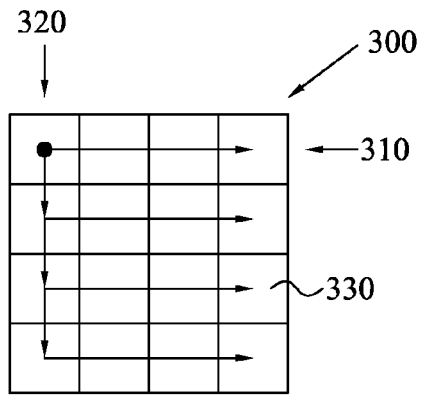
FIGS. 2A and 2B illustrate pixel blocks that can be used according to the present invention in a row-wise or column-wise compression.
Figure 2B:
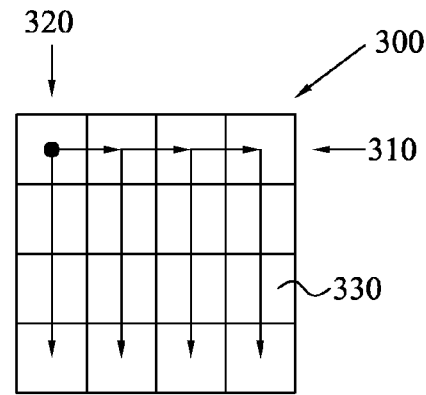

The codeword determining step of S1 preferably involves retrieving the pixel parameter value of a pixel in a selected pixel position in the block and optionally calculate (quantize) the codeword therefrom or use the retrieved value directly as reference codeword. The selected pixel position is preferably a predefined position in the block, implying that the same pixel position is used in the codeword determination step S1 for all blocks to be compressed according to the present invention. A preferred position is a pixel positioned in one of the corners of the block. Traditionally the pixel in the upper left corner is used in the case of depth buffer value compression in the art. However, the invention is not limited to that particular pixel position and can use any of the corner pixels or indeed any pixel in the block, though frame pixels and in particular corner pixels are preferred. FIGS. 2A and 2B illustrate a 4×4 block 300 of pixels 330 to be encoded. In these figures the pixel position used in determining the reference codeword is marked with a filled circle, i.e. the pixel in the upper left corner.

A next step S2 determines a row slope codeword for the block as a representation of a basic parameter slope for the rows of the block. In a preferred implementation, the pixel parameter values of (at least a portion of) the block are collinear and therefore has the same original row slope at least for the original, unquantized parameter values. For example, a pixel row could have the following original values [109.8, 112.6, 115.4, 118.2]. The slope is here the pairwise difference between adjacent parameter values in the row, 118.2−115.4=115.4−112.6=112.6−109.8=2.8. The same row slope is valid also for other rows of the block as long as the parameter values are collinear.

The row slope codeword is preferably a representation of the integer portion of the original row slope, i.e. 2 in the example above. If the original, unquantized parameter values are available in the compression, the codeword determination of step S2 can calculate the difference between any pair of adjacent pixel parameter values in any row of the block. The row slope codeword is then determined as a representation of the integer part of the calculated slope (difference).

If the parameter values are quantized, such as rounded into integer values, another approach is typically taken in step S2. A rounded version of the parameter values given above would be [110, 113, 115, 118]. A pairwise difference between adjacent values in the row would here give a value of 2 or 3. In such a case, the row slope codeword is consistently determined as a representation of the smallest or consistently determined as a representation of the largest slope value. The importance here is that either the smallest or the largest slope value must be taken for all blocks to be encoded. Preferably, the smallest calculated slope value is consistently used as a basis for the row slope codeword determining step. This also applies in the case of negative slopes. For instance, the slope could be −1.6 in the cases of original values and thereby be −1 or −2 when using the rounded values. In such a case, the smallest value −2 is preferably used as basis for the row slope codeword determination.

The next step S3 performs a similar procedure but for the columns in the block. The result is then a column slope codeword that is a representation of a basic parameter slope for the columns of the block. This step S3 is performed in the same way as step S2 but now parameter values in column are used instead of parameter values in a row.

Steps S1 to S3 can be performed in any order or indeed in parallel.

The compression of the pixel block 300 can now be performed row 310 by row 310, which is schematically illustrated in FIG. 2A or column 320 by column 320, which is illustrated in FIG. 2B. From quality point of view, the two possibilities are equivalent. In the following, the present invention is mainly described in connection with a row-by-row compression (see FIG. 2A). However, the teaching of the present invention can also be applied to a column-by-column compression. In the latter case, the expression "row" is simply replaced by "column" and vice versa in the following description.

A next step S4 generates a representation indicating pixel positions where a slope change occurs along at least a portion of a current row (or column in the case of FIG. 2B). This step S4 can be implemented by noting at which pixel positions the slope is different from the basic row slope of the block represented by the row slope codeword determined in step S2. Thus, assume a row of pixel values [110, 113, 115, 118] as above and with a basic parameter slope of 2. The difference between adjacent parameter values, i.e. slope, is in this example [−, 3, 2, 3]. In this case pixel position 1 and 3 have a slope different from two and therefore a slope change occurs at these two pixel positions. However, the slope at pixel position 2 is equal to the basic row slope and no slope change occurs here. If the basic row slope value is subtracted from the above listed slope values we get [−, 1, 0, 1]. As a consequence, a representation indicating pixel positions where a slope change occurs along the current row could be in the form of 1 0 1, where 1$_{bin}$ signal a slope change, whereas 0$_{bin}$ implies that the difference between adjacent parameter values at that position is equal to the basic row slope.

The position-indicating representation is preferably generated based on all the pixel parameter values of the row. However, for certain embodiments, it could be enough to merely use a subset of the pixel values in the row. These representations could be regarded as indicative of the relative distribution of parameter values when going along at least a portion of the row/column.

Step S4 is repeated at least one, which is schematically illustrated by the line L1. This means that a position-indicating representation is determined for at least two rows of the pixel block. In a preferred embodiment, step S4 is though performed for each row of the block.

A next step S5 determines a mode codeword for the block. This codeword is a representation of a set of multiple slope correction patterns. Each such pattern is a specific, predefined representation indicating position-dependent slope correctors applicable along a row. Thus, such a pattern is a bit sequence with slope correctors applicable, during decompression, to the basic row slope to obtain a correct slope value for the different pixel positions in the rows. For a four pixel row, the patterns could be from 000$_{bin}$ up to 111$_{bin}$. There are preferably multiple different pattern sets available, where each set comprises different sub-sets of the available slope correction patterns.

In the case the row slope codeword is a representation of the integer portion of the row slope obtainable through usage of the original, unquantized pixel parameter values, the pattern sets can be adapted for handling different fractional portions of the row slope. For instance, a first pattern set will be used for the block if the fractional portion of the original row slope is in the interval $[0, k_1]$, a second set is used if the fractional portion is in the interval $[k_1, k_2]$ and so on until the last pattern set, which is adapted for taking handling blocks with a fractional slope in the interval $[k_t, 1]$.

Thus, the mode codeword determining step S5 involves selecting a pattern set from the multiple predefined sets. If the original, unquantized parameter values are available and it is possible to calculate the original, unquantized row slope, the pattern set can be selected based on the particular fractional portion of the calculated row slope. However, in other applications, only the quantized parameter values are available in connection with block compression. In such a case, the particular pattern set to use is preferably selected based on the position-indicating representations generated in step S4. Then, at least two or preferably all position-indicating representations are used and compared to the different slope correction patterns available for the different sets. The set that encompasses patterns corresponding to position-indicating representations is selected. Each pattern set is preferably associated with a set identifier. This identifier associated with the selected pattern set is then used as mode codeword in step S5. For instance, a 2-bit mode codeword can be used if there are up to four different available sets, a 3-bit mode codeword can handle up to eight different sets, and so on.

Step S6 determines a pattern codeword as a representation of a slope correction pattern from the pattern set represented by the determined mode codeword. This pattern codeword determination is performed based on the position-indicating representation generated for the current row in step S4. Thus, step S6 involves selecting one of the slope correction patterns from the selected set that corresponds to the position-indicating representation calculated for the row. The pattern codeword is determined to be an indicator of the selected slope correction pattern.

Step S6 is preferably performed for all rows in the block or at least for those rows for which a position-indicating representation has been generated in step S4, which is schematically illustrated by the line L2. Each such row therefore has an assigned pattern codeword that is associated with one of the correction patterns in the pattern set represented by the determined mode codeword.

The method optionally, but preferably comprises determination of slope or pixel modifiers that are applicable when stepping down to a next row. Such a slope modifier is a single correction term that can be applied for obtaining a correct column slope when stepping down to the next row. For instance, assume that the quantized pixel parameter values of a first column are [110, 231, 351, 472]. The basic column slope would in this case be the smallest difference between two adjacent pixel values, i.e. 120. A slope or pixel modifier of $0_{bin}$ is then assigned those rows for which the slope is indeed 120 (going from row 1 to 2 in this example), while a modifier of $1_{bin}$ is used for those row transitions in which the slope is 121 and not 120. In the example here the slope modifiers would be 1 0 1. If the block comprises N rows, N−1 slope modifiers are then preferably determined.

The method therefore preferably comprises the additional step of determining, for the at least one row (or column in the case of FIG. 2B) in the block, a slope modifier applicable to the basic parameter slope for the columns. The modifier determination is furthermore performed based on at least a portion of the pixel parameter values of a column. The method then ends.

Figure 3:
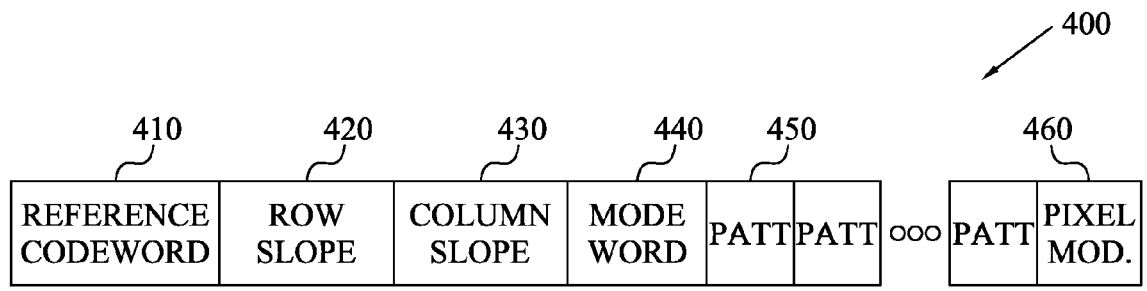
FIG. 3 is a schematic illustration of a compressed representation of a pixel block according to an embodiment of the present invention.

The result of the compression is a compressed representation of the original pixel block. FIG. 3 illustrates such a compressed block 400. The compressed block 300 comprises the reference codeword 410, a row slope codeword 420, a column slope codeword 430, a mode codeword 440 and multiple pattern codewords 450, preferably one such codeword 450 for each row (or column) in the block. The compressed block 400 preferably also comprises pixel or slope modifiers 460 for the column direction as previously described. It is anticipated by the present invention that the actual order of the including components of the compressed block 400 may differ from what is illustrated in the figure.

Figure 4:
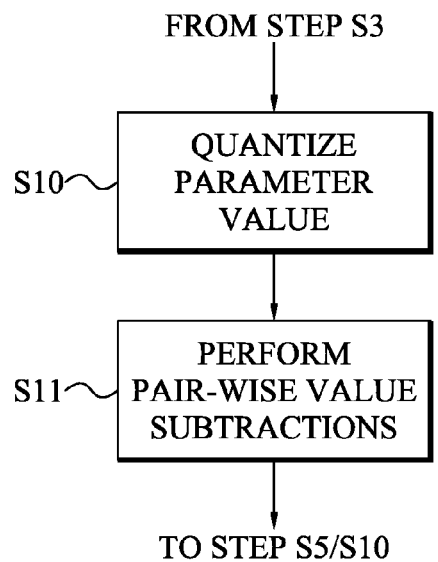
FIG. 4 is a flow diagram illustrating an embodiment of the generating step of FIG. 1 in more detail.

FIG. 4 is a flow diagram illustrating an embodiment of generating position-indicating representation in more detail. The method continues from step S3 of FIG. 1. A next step S10 quantizes the original parameter values unless the parameter values are already quantized. A typical example of quantization is rounding the values to integer numbers. Generally, the quantizing involves writing the original parameter value into a quantized value having a defined limited bit-size. The quantized value is then preferably the best Q-bit representation of the original value, where Q is the bit-size of the quantized values. A next step S11 performs a pair-wise subtraction of neighboring quantized pixel parameter values in a row (or column) and the basic parameter slope for the rows (or columns). Thus, the calculation involves determining $P_{i+1} - P_i - R$, where $P_i$ is the quantized pixel parameter value at position i in a row and R is the basic parameter slope for the rows. The method then continues to step S5 of FIG. 1 or back to step S10 for determining the position-indicating representation for a next row.

FIGS. 5A to 5C illustrate the principles behind determining position-indicating representations according to the present invention. A 4-pixel row could, for instance, have the following original parameter values [109.8, 112.6, 115.4, 118.2]. This would be equivalent to drawing a line with the slope 2.8, as can be seen in FIG. 5A.

In FIG. 5A, the pixels where the midpoint line of the pixel crosses the drawn line has been marked. The marked pixels also represent the values obtained by quantized the original values, i.e. [110, 113, 115, 118].

By removing the integer part of the slope 2.8, namely 2, from the unquantized parameter values, we get the following values: [109.8, 110.6, 111.4, 112.2]. This is equivalent of drawing FIG. 5B, where the slope of the line now must be smaller than 1 as only the fractional slope part remains. In this case, the fractional slope is 2.8−2.0=0.8.

From this diagram of FIG. 5B it is possible to identify those pixel positions in which a change in the slope occurs. This corresponds to those positions, for which we have to step up one step when going along the row. Pixel 0 is the anchor or reference value and does not have a correction value. Pixel 1 is one step higher than the previous pixel. This means that a change in row slope occurs at this position and thereby it gets a value of $1_{bin}$. Pixel 2 is the same height as the previous value and no slope change is occurs. The pixel therefore gets a value of $0_{bin}$. Finally pixel 3 gets a correction value of $1_{bin}$. FIG. 5C illustrates the final position-indicating representation $101_{bin}$ and it is seen that the representation can be thought of as a step pattern of different segment lengths.

The key to the invention here is to notice that all rows will have exactly the same fractional slope, in this case 0.8. This means that the only difference between the rows is the position of the line not its slope. This would then correspond to different step patterns with different step lengths.

FIG. 6 illustrates all the correction patterns, i.e. position-indicating representations, which are possible for a row of four pixels. The patterns have been organized into four different pattern sets. The first pattern set has an assigned mode codeword $00_{bin}$ and includes the patterns $000_{bin}$, $001_{bin}$, $010_{bin}$ and $100_{bin}$. These patterns correspond to segments of length 3 and 4. The mode covers fractional slopes from 0 to ⅓. A next set has mode codeword $01_{bin}$ and includes the correction patterns $101_{bin}$, $001_{bin}$, $010_{bin}$ and $100_{bin}$. This set includes patterns with segment lengths of 2 and 3 pixels and covers fractional slopes in between ⅓ and ½. The third set has mode codeword $10_{bin}$ and comprises the patterns $101_{bin}$, $110_{bin}$, $010_{bin}$ and $011_{bin}$. The patterns have zero or one segment of length 1 pixel between segments of length 2 pixels. Fractional slopes in the interval ½ and ⅔ can be handled with this set. The final set has been assigned codeword $11_{bin}$ and comprises the correction patterns $101_{bin}$, $110_{bin}$, $111_{bin}$ and $011_{bin}$. These patterns have one or two segments of length 1 between segments of length 2 pixels and cover the fractional interval ⅔ to 1.

The prior art DDPCM procedure suggested by Hasselgren and Akenine-Möller [1] spends 15 bits per 4×4 block in their correction matrix. The present invention need only, for this block size, a 2-bit mode codeword, four 2-bit pattern codewords (one for each row or column) and three 1-bit slope modifiers, which amounts to 13 bit. This means that 2 bits are saved as compared to the prior art solution. This 2-bit saving can be used for the purpose of reducing the total size of the compressed block. Alternatively if the same total compressed block size as the prior art would be advantageous, the two free bits can be used to boost the resolution in the reference codeword and/or slope codewords. Such a boosting means that the percentage of blocks that can be compressed in a lossless manner increases as compared to usage of the prior art techniques.

Compression Example

Herebelow follows a compressing example to illustrate the proceedings of the present invention. Assume a quantized input pixel block having the following parameter values:

$$\begin{bmatrix} 110 & 113 & 115 & 118 \\ 231 & 233 & 236 & 239 \\ 351 & 354 & 357 & 359 \\ 472 & 475 & 477 & 480 \end{bmatrix}$$

First a reference parameter pixel value is selected and the reference codeword is determined. The codeword can be a bit representation of the pixel value in the upper left corner, i.e. 110. In this example, the block is compressed row-by-row as illustrated in FIG. 2A. The basic row parameter slope is defined as the smallest slope when going one step in a row. In this example, the different row slopes are 2 and 3, which means that the row slope codeword is determined as a bit-representation of two. The corresponding column slopes are 120 and 121, which means that the column slope codeword is determined as a bit representation of 120. Thereafter, pair-wise subtractions are performed, in which a previous neighboring parameter value in the same row is subtracted from the next parameter value. Furthermore, the basic row parameter slope, 2, is subtracted from the resulting difference to obtain the position-indicating representation. The result for the first row is:

113−110−2=1
115−113−2=0
118−115−2=1

The position-indicating representation for that row is $101_{bin}$. Performing the same procedure for the other three rows gives:

$$\begin{bmatrix} - & 1 & 0 & 1 \\ - & 0 & 1 & 1 \\ - & 1 & 1 & 1 \\ - & 1 & 1 & 0 \end{bmatrix}$$

The relevant pattern set to use for the block is then selected based on these four position-indicating representations. By consulting FIG. 6, we see that the pattern set having mode codeword $11_{bin}$ contains all the required correction patterns. Particular correction patterns that correspond to the position-indicating representations are then determined for the rows. The first row has the representation $101_{bin}$. This corresponds to correction pattern with pattern codeword $00_{bin}$ in FIG. 6. The remaining rows have codewords $11_{bin}$, $10_{bin}$ and $01_{bin}$.

Finally, the slope modifiers for the columns are determined by a pair-wise subtraction of neighboring pixel parameter values in the first column and by subtracting the basic column parameter slope. The result becomes:

231−110−120=1
351−231−120=0
472−351−120=1

The slope modifiers are thus $101_{bin}$. The finally compressed block thus comprises:

i) a bit-representation of 110—reference codeword
ii) a bit-representation of 2—row slope codeword
iii) a bit-representation of 120—column slope codeword
iv) $11_{bin}$—mode codeword
v) $00_{bin}$, $11_{bin}$, $10_{bin}$, $01_{bin}$—pattern codewords
vi) $101_{bin}$—slope modifiers The gain in employing the present invention as compared to the prior art technique in document [1] was 2 bits for a 4×4 block. This might seem to be only a minor advantage. However, one should bear in mind that this 2-bit saving comes for free without any reduction in compression quality. For larger block sizes, such as 8×8 blocks, the gain is vastly increased as compared to the prior art.

Compared to 4×4 blocks, we require more pattern modes for 8×8 blocks to allow for more fractional slopes. The reason for that is that, since every row now have eight pixels instead of four, a finer grained representation is possible.

An analysis of the possible correction patterns shows that eight pattern modes would cover all cases:

Mode A: Correction patterns with segments of length 1 or 2, (four or more consecutive 1's)
Mode B: Correction patterns with segments of length 1 or 2, (three or four consecutive's)
Mode C: Correction patterns with segments of length 1 or 2, (two or three consecutive 1's)
Mode D: Correction patterns with segments of length 1 or 2, (one or two consecutive 1's)
Mode E: Correction patterns with segments of length 1 or 2, (zero or one consecutive 1's)
Mode F: Correction patterns with segments of length 2 or 3.
Mode G: Correction patterns with segments of length 3, 4 or 5,
Mode H: Correction patterns with segments of length 5, 6, 7 or 8.

For all these modes, only four bits are necessary to encode the entire row of eight pixels, see Annex. Thus, in an 8×8 block, the mode codeword becomes 3 bits, the pattern codewords are 4 bits. This means that, besides the reference codeword, row and column slope codewords, the compressed 8×8 block comprises 3+8×4+7=42 bits, where the last 7 bits are seven 1-bit slope modifiers for the first column. This should be compared to the prior art solution in document [1], which requires 63 bits for their correction matrix. As a consequence, 21 bits are saved per compressed block and can be used for boosting the resolution in the reference codeword, row slope codeword and/or column slope codeword. Alternatively, the total size of the compressed block can be reduced.

Whereas this solution is theoretically sound, it might not be optimal from an implementation point of view. To choose between 16 7-bit patterns (correction patterns) might become rather big in terms of surface area. The second thing is that we actually do not need so many extra bits in the 8×8 case. If we encode all parameters with full resolution, we get:
Reference codeword: 24 bits
Row and column slope codewords: 2×25 bits
Mode codeword: 3 bits
Pattern codewords: 8×4 bits
Slope modifiers 7 bits
Total: 116 bits This is much less than 128, and therefore it may make sense to use a little more inefficient encoding in order to ease the implementation burden. The desired bit-size of the compressed block is generally defined by the bandwidth of the bus used in the depth buffer architecture. A compressed block is preferably fetched in a single memory access or in as few as possible such accesses. Today, bus bandwidths for depth buffer architectures are typically 64 or 128 bits. As a consequence, it may be better to have a compressed block size of 128 bits or slightly less as compared to 116 bits as the 116-bit block will require the same number of memory accesses as a 128-bit block. However, if the implementation burden in terms of silicon area is significantly higher for the 116-bit version than the 128-bit version, the latter is most likely desirable.

An alternative is to encode the 8 pixel row (7 correction bits) as two 4 pixel rows (3 correction bits plus a 1-bit slope modifier). Then we can use the same encoding as in the 4×4 case. We then need 5 bits per row as we need two 2-bit pattern codewords per row plus a 1-bit slope modifier. An 8×8 block would be coded using:
Reference codeword: 24 bits
Row and column slope codewords: 2×25 bits
Mode codeword: 2 bits
Pattern codewords: 8×5 bits
Slope modifiers 7 bits
Total: 123 bits Which is still under the budget of 128 bits, if that is regarded as a preferred compressed block size.

In such a case step S4 of FIG. 1 involves generating, for a row/column and based on a first portion of the pixel parameter values of the row/column, a first position-indicating representation. The step S4 also comprises generating, based on a second (remaining) portion of the pixel parameters of the row/column, a second position-indicating representation. Step S6 then comprises determining a pattern codeword for each of the two pixel portions per row/column.

In the above-presented examples of the present invention, all pixel parameter values of the block have been in one plane. This covers very many different blocks in a depth buffer. However, sometimes two or more triangles can lie at least partly inside a given block. In such a case, the pixel parameter values of the block will belong to one of multiple different planes. A vast majority of the blocks can be handled if one plane per block or two planes per block can be allowed. In the following, such a two planes per block solution is presented. The solution assumes that a line can be used for providing a partitioning between the two planes. Using a line for partitioning does not cover all cases, such as when the tip of a triangle is inside the block, and such tiles must be left uncompressed. However, most cases can be handled using this simple partitioning. As is illustrated in FIG. 8, the pixels are divided into two partitions using a straight line, where a first pixel partition lie in a first plane and the other partition lie in a second plane. Note that the present invention is not limited to the particular partitioning illustrated in FIG. 8 but can handle any block having two planes which can be separated by a line in the block.

It would generally not be possible to have the same pattern mode for the two planes depending on the actual pixel parameter values. This is due to the fact that the pattern mode depends on the fractional slopes, which typically will be different for the two planes.

The line can either use the top left pixel (marked with filled circle) and bottom right pixel (marked with filled circle) as reference parameter values or anchor points, or the top right and bottom left. One bit, denoted diagonal bit, is stored in the compressed block to choose between these two configurations. The partitioning is preferably encoded in the same way as taught by Hasselgren and Akenine-Möller [1]. Briefly, we compute the position-indicating representation for at least a portion of the row or column. If the difference between the rounded pixel parameter values of two neighboring pixels of the row or column portion exceeds the basic row (column) parameter slope with more than one, we have reached a break point. The horizontal (vertical) coordinate of that pixel is then stored. We only store the first such break point along each row or column. If a break point is found while traversing along a column, rather than a row, then all remaining rows are given a break point coordinate of zero.

In FIG. 8 the partitioning is marked with a thick jagged line. Thus, in the example, the first row belongs completely to the leftmost plane, whereas for the second line, the first 7 pixels belong to leftmost plane and the last pixel belongs to rightmost plane, and so on.

In order to save bits compared to just storing the bit pattern above, we need to be able to store two segments per row (or column if column-wise compression is used) whose lengths sum to 8. To do so, we introduce a number of pattern modes for 3, 5 and 6 pixels.

FIG. 9 is an illustration of the correction pattern sets available for row segments of three bits. As can be seen in the figure, there are two pattern modes, each comprising three correction patterns: $00_{bin}$, $01_{bin}$, $10_{bin}$ for mode $0_{bin}$ and $11_{bin}$, $01_{bin}$, $10_{bin}$ for mode $1_{bin}$ Since there are three patterns in each set, a 2-bit pattern codeword would be required. However, as is described further below, it is possible to store the mode codeword and pattern codeword in the particular 3-pixel row portion more efficiently.

FIG. 10 illustrates the six pattern sets available in the case of a row portion of 5 pixels. Each such pattern set comprises five different correction patterns as illustrated in the figure. A pattern codeword size of three bits can be used for representing the different correction patterns. However, also here a more efficient way is possible, as is shown further below.

FIGS. 11A-11C collectively illustrate the seven pattern sets with six slope correction patterns per set that are available for a row portion of six pixels.

Looking at FIG. 8, there are nine possibilities to partition a row. The first row, for instance, has 8 pixels assigned to the leftmost plane and none assigned to the rightmost plane. The last row has one pixel assigned to the leftmost plane and seven to rightmost plane. The last (ninth) combination, which is not shown, is to have all eight pixels assigned to the rightmost plane.

8 Pixels Left—0 Pixels Right Partitioning

As is seen in FIG. 12A, with 8 pixels 310 on the left side of the border, we handle the row 310 as a 6-pixel row portion 312 plus one 3-pixel row portion 314. Thus, the current row needs one 1-bit slope modifier, a 3-bit first pattern codeword for the 6-pixel row portion 312 and a 2-bit second pattern codeword for the 3-pixel portion 314, giving a total of six bits.

7 Pixels Left—1 Pixel Right Partitioning

This scenario is illustrated in FIG. 12B. Again, we use one bit for the left slope modifier (y-component), and a 3-bit pattern codeword for the 6-pixel row portion 312 plus a single slope modifier for the remaining pixel 330 to the left of the border. To the right of the border, we have a single slope modifier (y-component). In total 1+3+1 bits for the left side and 1 for the right side, yielding 6 bits in total.

6 Pixels Left—2 Pixels Right

As can be seen in FIG. 12C, here we use one bit for the left slope modifier (y-component) and a 3-bit pattern codeword for the 6-pixel row portion 312 to the left of the border. To the right, we have a slope modifier (y-component) and a 1-bit slope modifier for the single pixel 330. Thus, 1+3 bits to the left and 1+1 to the right, which gives a total of six bits.

5 Pixels Left—3 Pixels Right

As is illustrated in FIG. 12D, a straightforward solution would be to use a 5-pixel row portion 310 to the left of the border and 3-pixel segment 312 to the right.

However, one problem with this is that the 5-pixel chunk is represented by a quinary variable that needs three bits if stored independently. Also, the 3-segment is a ternary variable, needing two bits. Taken together with the two slope modifier (y-component) bits, this is seven bits. This is inconvenient as all other combinations can be managed with only 6 bits. However, it is actually possible to reduce this bit utilization for the present case.

In such a case, the quinary variable is stored together with the ternary variable. Since 5×3=15<16, we only need four bits to store both segments. For instance, the encoding of Table I could be used:

TABLE I

| collective coding of 3 and 5 slope correction patterns | | |
|---|---|---|
| Code | 5-pixel pattern | 3-pixel pattern |
| $0000_{bin}$ | $000_{bin}$ | $00_{bin}$ |
| $0001_{bin}$ | $001_{bin}$ | $00_{bin}$ |
| $0010_{bin}$ | $010_{bin}$ | $00_{bin}$ |
| $0011_{bin}$ | $011_{bin}$ | $00_{bin}$ |
| $0100_{bin}$ | $100_{bin}$ | $00_{bin}$ |
| $0101_{bin}$ | $000_{bin}$ | $01_{bin}$ |
| $0110_{bin}$ | $001_{bin}$ | $01_{bin}$ |
| $0111_{bin}$ | $010_{bin}$ | $01_{bin}$ |
| $1000_{bin}$ | $011_{bin}$ | $01_{bin}$ |
| $1001_{bin}$ | $100_{bin}$ | $01_{bin}$ |
| $1010_{bin}$ | $000_{bin}$ | $10_{bin}$ |
| $1011_{bin}$ | $001_{bin}$ | $10_{bin}$ |
| $1100_{bin}$ | $010_{bin}$ | $10_{bin}$ |
| $1101_{bin}$ | $011_{bin}$ | $10_{bin}$ |
| $1110_{bin}$ | $100_{bin}$ | $10_{bin}$ |
| $1111_{bin}$ | not used | not used |

Table I refers to the slope correction patterns illustrated in FIGS. 9 and 10.

In this way, we need two bits for the slope modifier (y-components) and four bits for the pattern codewords, yielding six bits in total.

4 Pixels Left—4 Pixels Right:

This is a simple case, we can use 4-pixel patterns for both pixel row portions 312, 314 on either side of the border as illustrated in FIG. 12E.

Thus 1 bit for the slope modifier (y-component) and 3 bits for the pattern codeword on the left side, and likewise on the right side. In total six bits.

For those cases with 3, 2, 1 and zero pixels on the left side of the border of a row and 5, 6, 7 and 8 pixels on the right side, the same coding as was described above is utilized though the two pixel portions are exchanged.

Also note that, even though we can use different row segment lengths for different rows, we can use the same mode for all rows. However, a situation can happen where a row comprises a 6-pixel row segment and another row of the same plane contains a 3-pixel row segment and, the 6-pixel row segment need mode $110_{bin}$. For 3-pixel row portions we only have two modes $0_{bin}$ and $1_{bin}$ to choose from. In such a case, the selection of mode (codeword) and pattern set can therefore be performed according to Table II below. In Table II, the different modes listed for the chunk lengths corresponds to the numbering illustrated in FIGS. 6, 9, 10 and 11A to 11C.

TABLE II

| | | Mode selection | | | | | | |
|---|---|---|---|---|---|---|---|---|
| | | Mode codeword stored in block | | | | | | |
| | | 000 | 001 | 010 | 011 | 100 | 101 | 110 |
| Mode used in decompression | 3-pixel chunk | 0 | 0 | 0 | 0 | 1 | 1 | 1 |
| | 4-pixel chunk | 00 | 00 | 00 | 01 | 10 | 11 | 11 |
| | 5-pixel chunk | 000 | 000 | 001 | 010 | 011 | 100 | 101 |
| | 6-pixel chunk | 000 | 001 | 010 | 011 | 100 | 101 | 110 |

Thus we only need to store one mode codeword per plane using three bits. Since we have two planes, this means 6 bits for the row codewords. In total, we need six bits per row as was described above and we have 8 rows, giving 8×6=48 bits for the pattern codewords and slope modifiers. However, we do not need a slope modifier for the top left and bottom right y-coordinates (or top right and bottom left), yielding 46 bits for the pattern codewords and slope modifiers. Together with the mode codewords, this amounts to 46+6=52 bits. This should be compared to the matrix-based solution presented in document [1], which requires 62 bits. Thus, the present invention achieves a bit saving of 10 bits as compared to the prior art per block having two planes.

Looking at the 192-bit version of the 2-plane 8×8 system from document [1], the following bit layout is presented:

Diagonal bit: 1 bit

Anchor points: 21+22=43 bits

Deltas: 4×15=60 bits

Partitioning bits: 26 bits

Correction bits: 62 bits

Total: 192 bits

Using our invention, we could code the correction bits using 52 bits instead of 62. If a similar total bit size is desired for the block, a possible bit distribution could then be as follows:

Diagonal bit: 1 bit

Reference codewords: 2×24=48 bits

Row slope codewords: 2×16=32 bits

Column slope codewords: 2×16=32 bits

Partitioning bits: 26 bits

Correction bits*: 52 bits
Total: 191 bits

Correction bits represent mode codewords, pattern codewords and slope modifiers.

In this illustrative example, the number of bits spent on the reference codeword and the slope codewords has been increased compared to document [1]. Alternatively, more bits can be spent on the slope codewords with only a slight or no increase in the number of bits spent on the reference codeword. In any case, the increased number of bits for the other parameters means that the present invention is able to compress a higher percentage of the blocks in the depth buffer, meaning that memory bandwidth will be lowered.

Compared to the 4×4 system in document [1], the present invention has improved the one-plane mode with two bits, or 3% of the bits. These two bits can be used to extend the range of some parameters, making it possible to compress a higher percentage of the tiles, thus lowering memory bandwidth requirements. Compared to the 8×8 system in document [1], the present invention has improved the one-plane mode with 14 to 20 bits, or 11-16% of the bits. The one-plane mode can therefore now handle all possible one-plane blocks, increasing the percentage of tiles that can be compressed using this mode. The two-plane mode is improved by 10 bits, or 8% of the bits. These bits are also spent on improving the range of the parameters so that a higher percentage of the blocks can be compressed.

Thus, the present invention is able to compress a block of M×N pixels by determining the reference codeword, the row slope codeword, the column slope codeword and a modifier codeword, where the modifier codeword is a representation of multiple slope modifiers or correctors applicable to at least one of the basic row parameter slope and the basic column parameter slope. This modifier codeword collectively represents the mode codeword, the pattern codewords and the slope modifiers. In clear contrast to the prior art techniques, the present invention can determine such a modifier codeword to have total length of fewer than M×N−1 bits. For example, Hasselgren and Akenine-Möller need 15 bits for representing their correction matrix with a 4×4 block, while the present invention only needs 13 bits. Correspondingly, the prior art needs at least 63 bits for the correction matrix with an 8×8 block and the present invention can handle such a block with 43 bits.

Briefly, returning to FIG. 1. If a block comprises two planes as described above, step S1 comprises determining a first reference codeword for the pixels of the first plane and determining a second reference codeword for the pixels of the second plane. The two codewords preferably represents the pixel parameter values at positions in the top left corner and the bottom right corner or the top right corner and the bottom left corner of the block. Correspondingly, the steps S2 and S3 comprise determining a respective row and column slope codeword for each of the two planes in the block. These steps are performed as previously described but using pixels belonging only to the respective plane in the block.

Step S4 comprises generating, for a row or column and based on a first portion of the pixel parameters of the row/column, a first representation indicating pixel positions where a slope change occurs along the first row/column portion. Step S4 also involves generating, for the row/column and based on a second portion of the pixel parameters of the row/column, a second representation indicating pixel positions where a slope change occurs along the second portion. In this case, the first row/column portion belongs to the first plane and the second row/column portion belongs to the second plane. This step S4 is preferably repeated for all rows/columns in the block. Note that for one of the rows/columns, all pixels may belong to only one of the planes. In such a case, a single position-indicating representation is then generated for that row/column.

Step S5 determines a first mode codeword for the first plane in the block and a second mode codeword for the second plane. The codeword determination is preferably performed based on the generated position-indicating representations for the rows/columns/belonging to the different planes and preferably based on Table II listed presented above. In most practical cases, the two mode codewords will have different bit values and therefore represent different pattern sets.

Step S6 determines pattern codewords for the different row/column portions as representations of the slope correction patterns selected from the pattern set used for each plane in the block. Thus, the first plane generally can select correction patterns from a first pattern set, while slope correction patterns from a second, different pattern set are available for the row/column portions of the second plane. The pattern codeword determination is performed based on the position-indicating representations generated for the different row/column portions. Note that the complete block can be encoded in a single operation so that the two pattern codewords are generated together.

Finally, the slope modifiers are determined for the two planes basically by performing the previously described procedure once per plane.

The method illustrated in FIG. 1 also involves determining a partition pixel of a row/column. The portion of the row/column belonging to the first plane and the portion of the row/column belonging to the second plane can then be defined based on the partition pixel. Such a partition pixel is preferably determined for multiple of the rows/columns in the block.

Decompression

FIG. 13 illustrates a flow diagram illustrating a method of decompressing a pixel from a compressed pixel block. The method starts in step S20, where a reference pixel parameter value is generated based on the reference codeword. In a typical implementation, there is a one-to-one relationship between the reference value and the codeword and step S20 merely involves retrieving the bits corresponding to the reference codeword from the compressed block. However, in other applications, the reference value could be obtained by, for instance, expanding the X bits of the reference codeword to a Y-bit value, where X≠Y, e.g. by copying the sign bit to get a Y-bit value or by adding a pre-defined bit word, such as a word of only $1_{bin}$, as the most significant bits to the X-bit codeword to get the Y-bit value.

A basic parameter slope is determined in step S21. This step can involve determining a basic row parameter slope based on the row slope codeword in the block, determining a basic column parameter slope based on the column slope codeword, but preferably involves determining both the row and column parameter slope. This generation can be performed by a simple bit-retrieving process or an expanding process as mentioned above for the reference value.

A next step S22 provides a set of correction patterns based on the mode codeword in the compressed block. Each row/column of the block is associated with a pattern codeword that is used in step S23 for selecting one of the slope correction patterns in the pattern set provided in step S22.

The steps S20-S22 can be performed in any order or indeed in parallel.

The parameter value for a pixel in the block is then calculated in step S24 based on the reference pixel parameter value from step S20, the basic parameter slope from step S21, i.e.

the basic row parameter slope and/or the basic column parameter slope, and the selected slope correction pattern.

Optionally, and depending on the particular position of the pixel in the block one or more slope modifiers that are applicable to the basic column/slope parameter slope can be used in the value calculation of step S24.

The method then ends.

The correction pattern selected in step S23 comprises multiple slope correctors. The particular slope corrector(s) to use in the parameter value calculation of step S24 depends on the position of the pixel in a row or column of the pixel block.

The following equation 1 can be used for representing the calculation of the pixel parameter value of step S24 in the case of a row-wise decompression, see FIG. 2A:

$$\text{Value}(x, y) = R + x \times \Delta^x + y \times \Delta^y + \sum_{i=0}^{x} P_i^x + \sum_{j=0}^{y} S_j^y \quad (1)$$

where Value(x, y) represents the calculated parameter value at pixel position (x, y) in the block, x=0, 1, M and y=0, 1, N (M, N are integer numbers with the proviso that both M and N are not one), R is the reference parameter value, $\Delta^x$ is the basic row parameter slope, $\Delta^y$ is the basic column parameter slope, $P_i^x$ is the slope corrector at pixel position i in a row and obtained from the slope correction pattern, $S_j^y$ is the slope modifier assigned to row j. In equation 1 $P_0^x=0$ and $S_0^y=0$. In the case of a column-wise decompression, see FIG. 2B, equation 1 is rewritten and becomes:

$$\text{Value}(x, y) = R + x \times \Delta^x + y \times \Delta^y + \sum_{i=0}^{y} P_i^y + \sum_{j=0}^{x} S_j^x \quad (2)$$

where $P_i^y$ is the slope corrector at pixel position i in a column and obtained from the slope correction pattern, $S_j^x$ is the slope modifier assigned to column j. In equation 2 $P_0^y=0$ and $S_0^x=0$.

Decompression Example

For example, assume the following compressed block representation:
Reference codeword: 0000 0000 0010 0100 0110 1001
Row slope codeword: 0 0000 0000 0000 0001 1011 0000
Column slope codeword: 1 1111 1111 1111 1111 1001 0111
Mode codeword: 10
Pattern codewords: 00 01 11 01
Slope modifiers: 1 0 1
The reference parameter value is then: 9321
Basic row parameter slope: 432
Basic column parameter slope: −105

The particular pattern set to use is pattern 2 ($10_{bin}$) from FIG. 6. In the first row, the correction pattern should be 1 0 1. The parameter values of the first row are then:
Value(0,0)=9321
Value(1,0)=9321+432+1=9754
Value(2,0)=9754+432+0=10186
Value(3,0)=10186+432+1=10619

The correction pattern for the second row should be 1 1 0 as the pattern codeword is $01_{bin}$ for that row. The parameter values of the second row become:
Value(1,0)=9321−105+1=9217
Value(1,1)=9217+432+1=9650
Value(1,2)=9650+432+1=10083
Value(1,3)=10083+432+0=0515

A similar procedure can then be conducted for the remaining rows.

Implementation Aspects

FIG. 14 is a schematic overview of a depth buffer architecture 1, to which the teachings of the present invention can be applied. The architecture comprises a random access memory (RAM) 50 for storing pixel blocks comprising, among others, depth values. A depth unit 10 comprises a decompressor 200 according to the present invention for decompressing compressed blocks fetched from the RAM 50. The decompressed or decoded blocks are temporarily stored in an associated tile cache 14 of the depth unit 10. A compressor 100 according to the present invention is also provided in the depth unit 10 for compressing pixel blocks present in the cache 14 for storage in the RAM 50.

In a preferred embodiment, the depth unit 10 also comprises a tile table cache 12. This table cache 12 store header information associated with the pixel blocks but kept separately from the depth buffer data. The tile table entries typically contains flags signaling whether the associated pixel block is stored in uncompressed form or in a compressed form in the RAM 50. In the latter case, the flag preferably also signals the size of the compressed block, as different compressed blocks can have different total bit lengths. For example, a 2-bit flag can be used for signaling uncompressed block, compressed with 75% of original size, compressed with 50% of original size or compressed with 25% of original size.

A rasterizer 20 is connected to the depth unit 10 and performs the actual rasterization of pixels. The rasterizer 20 is connected to one or multiple pixel pipelines 30 that are employed for computing the depth and color of a pixel. Each pixel pipeline 30 is connected to a depth testing unit 40 responsible for discarding pixels that are occluded, i.e. having a larger depth value, by previously drawn geometry.

Compressor

FIG. 15 is a schematic block diagram of a compressor 100 according to the present invention. The compressor 100 comprises a reference quantizer 110 arranged for determining a reference codeword as a representation of a reference pixel parameter value for a pixel block to be compressed. A row slope quantizer 120 determines a row slope codeword for the block as a representation of a basic parameter slope for the rows in the block as previously described. A corresponding column slope quantizer 130 is arranged for determining a basic parameter slope for the block columns.

The compressor 100 also comprises a representation generator 140 for generating, for each row/column in at least a portion of the block, preferably all rows/columns in the block, a position-indicating representation. The generator 140 preferably performs the representation generation based on at least a portion of the pixel parameter values of (the portion of) the row/column. A mode selector 150 is provided in the compressor 100 for determining a mode codeword as a representation of a set of multiple slope correction patterns of specific, predefined slope correctors applicable along a row/column. The mode selector 150 preferably performs a selection of such a set from multiple defined pattern sets based on the position-indicating representations generated by the generator 140. Once such a pattern set has been selected, the mode selector 150 provides the mode codeword as a representation of the selected pattern set.

A pattern manager 160 is arranged connected to the mode selector 150 for determining, for at least one row/column, preferably all rows/columns in the block, a pattern codeword as a representation of one of the slope correction patterns in the pattern set selected by the mode selector 150. The manager 160 is also connected to the representation generator 140 and uses the particular position-indicating representation for the rows/columns in deciding which slope correction patterns of the set to use for the different rows/columns.

Though, not illustrated in the figure, the compressor 100 preferably also comprises a modifier generator for generating at least one slope modifier applicable to the basic column/row parameter slope during decompression.

As has been described in the foregoing, the pattern manager 160 can actually determine two pattern codewords per block row/column, in particular if an 8-pixel row/column is managed as two 4-pixel chunks. Furthermore, in the case the pixels in the block are not collinear but instead belongs to one of two planes, the quantizer 110 determines a first and a second reference codeword, i.e. one for each plane in the block. The slope quantizer 120, 130 likewise determines a first and second row and column slope codeword, respectively. The representation generator 140 will determine two position-indicating representations for some rows/columns in the block, while for others it only determines one such representation depending on how many bits respective row/column chunk comprises. The mode selector 150 determines a first mode codeword for the first plane and a second mode codeword for the second plane. The pattern manager 160 then selects pattern codewords representing slope correction patterns of the set defined by the first mode codeword for row/column chunks present in the first plane and selects pattern codewords representing slope correction patterns of the set defined by the second mode codeword for the row/column chunks of the second plane.

The units 110 to 160 of the compressor 100 may be provided as software, hardware or a combination thereof. The units 110 to 160 may be implemented together in the compressor 100. Alternatively, a distributed implementation is also possible with some of the units provided elsewhere in the depth buffer architecture.

FIG. 16 is a schematic block diagram of an embodiment of a representation generator 140. This generator 140 comprises an optional value quantizer 142 arranged for quantizing, e.g. rounding, original parameter values into quantized values. If the input parameter values are already quantized, this unit 142 can be omitted. A calculator 144 is arranged in the generator 140 for subtracting, for each pixel in at least a portion of a row/column, the quantized parameter value of a preceding pixel in the row/column or the reference parameter value and the basic parameter slope for the rows/columns from the quantized parameter value of the current pixel. Once this procedure is performed for all pixels in the row/column (portion), the position-indicating representation is determined.

The units 142 and 144 of the representation generator 140 may be provided as software, hardware or a combination thereof. The units 142 and 144 may be implemented together in the representation generator 140. Alternatively, a distributed implementation is also possible with some of the units provided elsewhere in the compressor.

Decompressor

FIG. 17 is a schematic block diagram of a decompressor 200 according to the present invention. The decompressor 200 comprises a reference generator 210 for generating a reference pixel parameter value based on a reference codeword in a compressed pixel block. The generator 210 can be configured for simply retrieving the bit-sequence of the codeword for providing the reference value or further process the bit-sequence, such as expand it, to get the target value. A slope generator 220 is provided in the decompressor 200 for determining a basic parameter slope based on a slope codeword of the compressed block. In a first embodiment, the generator 220 only determines a basic row slope based on a row slope codeword. A second embodiment involves determining a basic column slope using a column slope codeword. However, in a third and preferred embodiment, the slope generator 220 determines both a basic row slope and a basic column slope based on row and column slope codewords, respectively.

The decompressor 200 also comprises a set provider 230 for providing a set of multiple slope correction patterns based on a mode codeword of the compressed block. The provider 230 preferably selects the set from a storage location (not illustrated) containing multiple different such pattern sets.

A pattern selector 240 is arranged for selecting a slope correction pattern from the provided set based on a pattern codeword associated with the row/column containing a pixel to be decoded. A value determiner 250 is connected to the reference generator 210, the slope generator 220 and the pattern selector 240. The determiner 250 calculates the pixel parameter value for the pixel based on the reference parameter value from the reference generator 210, the basic (row and/or column) parameter slope from the slope generator 220 and the slope correction pattern from the selector 240. The determiner 250 can be implemented to perform any of the calculations presented in equation 1 or 2 above to determine the pixel parameter value. In an alternative calculation, the determiner 250 simply adds the basic parameter slope and a slope corrector selected from the slope correction pattern to a pixel parameter value determined by the determiner 250 for a previous neighboring pixel the row/column or to the reference pixel parameter value. In such a case, the decompressor 200 may comprise a modifier selector 260 arranged for selecting a particular slope corrector from the pattern based on the position of the current pixel in the block or in a row/column of the block.

Depending on whether the block comprises pixels belong to different planes or whether a row/column is handled as two row/column chunks, the reference generator 210 can determine two basic reference values (one for each plane), the slope generator 220 generates two row and two column parameter slopes (one row and column slopes per plane), the set provider 230 provides two pattern sets (one for each plane), the pattern selector 240 selects one or two slope correction patterns per row/column (depending on the partition position).

The units 210 to 260 of the decommpressor 200 may be provided as software, hardware or a combination thereof. The units 210 to 260 may be implemented together in the decompressor 200. Alternatively, a distributed implementation is also possible with some of the units provided elsewhere in the depth buffer architecture.

It will be understood by a person skilled in the art that various modifications and changes may be made to the present invention without departure from the scope thereof, which is defined by the appended claims.

REFERENCES

[1] Haselgren and Akenine-Möller, "Efficient Depth Buffer Compression", *Graphics Hardware*, 2006, pp. 103-110

ANNEX

This annex provides information of determining pattern codewords for a block having eight pixels per row or column. It was previously disclosed that there are eight different modes (mode A to H) having correction patterns of different segment lengths.

Mode A

Figure 18A:
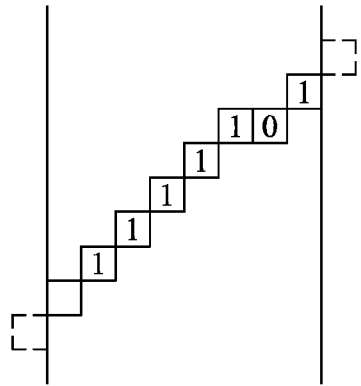

This mode relates to correction patterns having segments of length two pixels and segments of length one pixel, where there are four or more segments of length one between the segments of length two. The first 3 bits represents the position of the first 2-pixel segment along the row or column. If there is no 2-pixel segment, position 7 will be used. The last bit tells if there are four segments of length one before the next segment of length two ("$0_{bin}$"), or if there are five or more segments of length one before the next segment of length two ("$1_{bin}$"). Depending on the position of the first 2-segment, this bit may be unnecessary. In such a case, the bit can be omitted or set to an arbitrary value. FIG. 18A schematically illustrates this scenario with a correction pattern of $1111011_{bin}$. The 2-pixel segment occurs at pixel position number five in the row. As a consequence, the first three bits of the pattern codeword can be set to $101_{bin}$=5. The last bit can be omitted and $101_{bin}$ can be used as representation of the correction pattern $1111011_{bin}$. Alternatively, an arbitrary bit can be added and $1010_{bin}$ or $1011_{bin}$ can be used as a representation of the correction pattern $1111011_{bin}$.

Figure 18B:
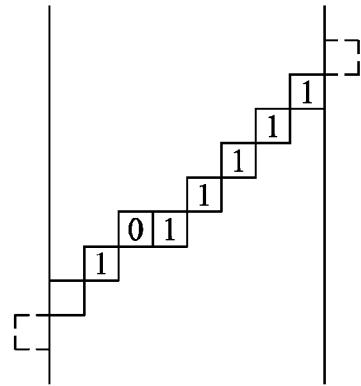

Another example is in FIG. 18B. Here the first three bits of the pattern codeword is $010_{bin}$, indicating that the first 2-pixel segment is at position 2. Since it does not matter if four or more one-segments follow this two-segment, the last bit of the pattern codeword can be omitted or set to an arbitrary value.

Figure 18C:
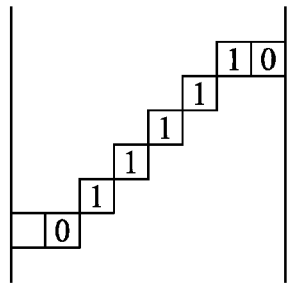

A third example is the pattern $0111110_{bin}$ in FIG. 18C. Here, the first three bits are $000_{bin}$ to indicate that the first 2-pixel segment is at position 0. The last bit is 0, indicating that there are four 1-pixel segments before the next two-segment. Hence, the pattern codeword $0000_{bin}$ can be used to represent the pattern $011110_{bin}$. This principle can then be extended to other pixel positions of the first 2-pixel segment of this mode.

Mode B

The mode encompasses correction patterns with segments of length one or two pixels and having three or four consecutive 1-pixel segments. A 4-bit pattern codeword can be used for representing the different correction patterns of this mode. Again, three of the four bits are employed for defining the position of the first 2-pixel segment in the row or column. For FIG. 18C this would be position 0 and the 3-bit position representation is therefore $000_{bin}$. A single bit is used for discriminating whether the first 2-pixel segment is directly followed by three or four 1-pixel segments. In FIG. 18C, there are four such segments, meaning that the complete pattern codeword would be $0001_{bin}$ in this case, where the last $1_{bin}$ indicates that there are four 1-pixel segments. Alternatively, since there are only eight possible correction patterns in mode B, a 3-bit pattern codeword could be used.

Mode C

Figure 18D:
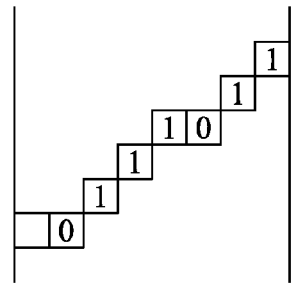
Figure 18E:
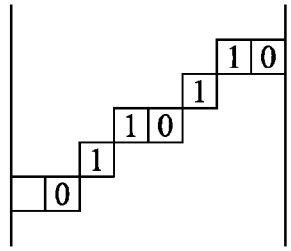

Mode C relates to correction patterns with segment lengths of one or two pixels and having two or three consecutive 1-pixel segments between the 2-pixel segments. A 4-bit pattern codeword is able to represent the correction patterns available in mode C. Three of the four bits are dedicated for representing the position of the first 2-pixel segment in the row or column. The remaining bit is used for signaling whether there are two or three consecutive 1-pixel segments before the next 2-pixel segment in the row or column. FIG. 18D illustrates the correction pattern $0111011_{bin}$. The position of the first 2-pixel segment is pixel number zero and this 2-pixel segment is followed by two 1-pixel segments before the next 2-pixel segment. The pattern codeword could therefore be $0000_{bin}$ in this case. Note here that it is not necessary to specify the number of one-segments after the second 2-pixel segment, since it will not affect the correction pattern. Alternatively, since there are only eight possible correction patterns in mode B, a 3-bit pattern codeword could be used.

Mode D

This mode refers to correction patterns with segment lengths of one or two pixels and having one or two consecutive 1-pixel segments. Two bits of a O-bit pattern codeword are used for defining the number of consecutive 1-pixel segments that precede the first 2-pixel segment in the row or column ($00_{bin}$-$11_{bin}$ for discriminating between zero to three 1-pixel segments). A next bit signals whether the first 2-pixel segment is followed by one or two consecutive 1-pixel segments and the final bit defines whether a second 2-pixel segment is followed by one or two consecutive 1-pixel segments, see FIG. 18E. The figure illustrates the correction pattern $0110110_{bin}$. There are zero 1-pixel segments before the first 2-pixel segment, giving $00_{bin}$. There is a single 1-pixel segment following both the first and second 2-pixel segments, resulting in, for instance, $0_{bin}$ and $0_{bin}$. The final pattern codeword, thus, becomes $0000_{bin}$ in this mode.

Mode E

Figure 18F:
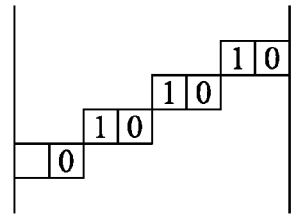
Figure 18G:
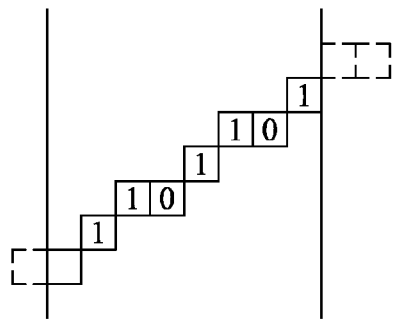

The mode has correction patterns with 1- or 2-pixel segment lengths and has zero or one consecutive 1-pixel segments. One bit of a 4-bit pattern codeword defines whether the first segment in the row or column is a 1- or 2-pixel segment. Each of the remaining bits signals whether there are zero or one 1-pixel segment before a following 2-pixel segment. FIGS. 18F and 18G illustrate two possible correction patterns according to this mode. FIG. 18F has the correction pattern $0101010_{bin}$ and FIG. 18G has $1101101_{bin}$. In FIG. 18G the first segment is a 2-pixel segment and in FIG. 18F the first segment is a 1-pixel segment. The first bits of the pattern codewords are therefore $1_{bin}$ and $0_{bin}$, respectively. There are no 1-pixel segments preceding any of the 2-pixel segments in FIG. 18G, which can be represented by $0_{bin}$, $0_{bin}$ and $0_{bin}$. In FIG. 18F all the 2-pixel segments have a respective preceding 1-pixel segment, giving $1_{bin}$, $1_{bin}$ and $1_{bin}$. The final pattern codeword for the correction pattern of FIG. 18G is therefore $1000_{bin}$ and for FIG. 18F $0111_{bin}$.

Mode F

Mode F has correction patterns with segment lengths of 2 or 3 pixels. The first two bits of the pattern codeword represent the following situations. $00_{bin}$ is used if the first segment in the row or column is a 1-pixel segment followed by a 2-pixel segment. $01_{bin}$ represents a 1-pixel segment followed by a 3-pixel segment. If the first segment is a 2-pixel segment the bit combination $10_{bin}$ is used and $11_{bin}$ defines that the first pixel segment is a 3-pixel segment. The third bit in the pattern codeword defines whether the segment(s) defined by the two first bits is followed by a 2- or 3-pixel segment and the fourth bit signals with this 2- or 3-pixel segment is followed by a 2- or 3-pixel segment.

Figure 18H:
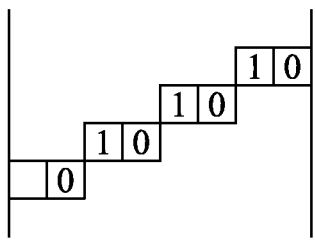

FIGS. 18H to 18K illustrate different correction patterns for this mode. In FIG. 18H the first segment is a 2-pixel segment given $10_{bin}$ according to above. This 2-pixel segment is followed by two 2-pixel segments giving $0_{bin}$ and $0_{bin}$. It does not matter whether the final segment is a 2-pixel segment or a 3-pixel segment as the correction pattern will be the same. Thus, the pattern $0101010_{bin}$ is represented by $1000_{bin}$.

Figure 18I:
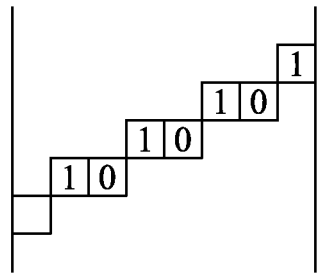

FIG. 18I has a 1-pixel segment followed by a 2-pixel segment, resulting in $00_{bin}$. The following two segments are both of lengths 2 pixels (it does not matter whether the last segment is of two or three pixels as only the first pixel is within the 8 pixels of the row or column). The pattern codeword is there $0000_{bin}$.

Figure 18J:
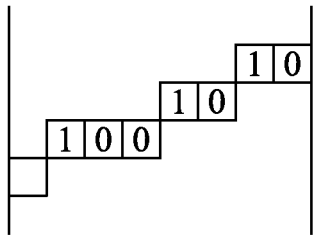

FIG. 18J has a 1-pixel segment and then a 3-pixel segment. The first two bits should therefore be $01_{bin}$. These segments are followed by 2-pixel segment. In this case the pattern codeword can be of only three bits, i.e. $010_{bin}$ as it does not matter whether the last two pixels belong to a 2-pixel segment or a 3-pixel segment. Thus, the fourth bit can be omitted or set to an arbitrary value.

Figure 18K:
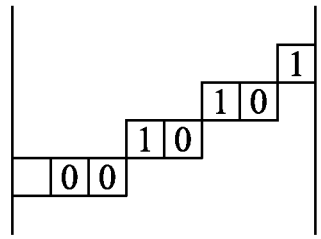

FIG. 18K has a 3-pixel segment (resulting in $11_{bin}$) followed by two 2-pixel segments (resulting in $0_{bin}$ and $0_{bin}$). It is irrelevant whether the final pixel belongs to a 2- or 3-pixel segment. The correction pattern $0010101_{bin}$ is therefore represented by the codeword $1100_{bin}$ in this mode.

Mode G

This mode relates to correction patterns with segment lengths of 3, 4 or 5 pixels. In this case, all the possible correction patterns are found in the left column of Table III below:

TABLE III pattern codewords in mode G

| Correction pattern | Pattern codeword |
| --- | --- |
| $1001000_{bin}$ | $0000_{bin}$ |
| $1001001_{bin}$ | $0001_{bin}$ |
| $1000100_{bin}$ | $0010_{bin}$ |
| $0100100_{bin}$ | $0011_{bin}$ |
| $0100010_{bin}$ | $0100_{bin}$ |
| $0010010_{bin}$ | $0101_{bin}$ |
| $0010001_{bin}$ | $0110_{bin}$ |
| $0001001_{bin}$ | $0111_{bin}$ |
| $0001000_{bin}$ | $1000_{bin}$ |
| $1000010_{bin}$ | $1001_{bin}$ |
| $0100001_{bin}$ | $1010_{bin}$ |
| $0010000_{bin}$ | $1011_{bin}$ |
| $0000100_{bin}$ | $1100_{bin}$ |

As can be seen from Table III, only 13 correction patterns are possible in this mode. Hence, four bits are sufficient to specify these correction patterns, for instance using the pattern codewords proposed in the right column of Table III.

Figure 18L:
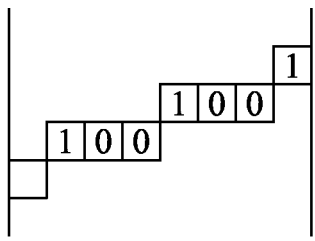
Figure 18M:
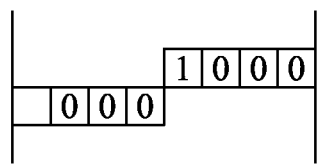

FIG. 18L illustrates the correction pattern $1001001_{bin}$. According to Table III, the pattern codeword is therefore $0001_{bin}$ in this case. FIG. 18M illustrates the correction pattern $0001000_{bin}$, which can be represented by the 4-bit codeword $1000_{bin}$ according to Table III.

Mode H

Mode H refers to correction patterns having 5-6-, 7- or 8-pixel segments. In Table IV below all possible correction patterns for this mode are listed in the left column:

TABLE IV pattern codewords in mode H

| Correction Patterns | Pattern codeword |
| --- | --- |
| $1000010_{bin}$ | $0000_{bin}$ |
| $1000001_{bin}$ | $0001_{bin}$ |
| $1000000_{bin}$ | $0010_{bin}$ |
| $0100001_{bin}$ | $0011_{bin}$ |
| $0100000_{bin}$ | $0100_{bin}$ |
| $0010000_{bin}$ | $0101_{bin}$ |
| $0001000_{bin}$ | $0110_{bin}$ |
| $0000100_{bin}$ | $0111_{bin}$ |
| $0000010_{bin}$ | $1000_{bin}$ |
| $0000001_{bin}$ | $1001_{bin}$ |
| $0000000_{bin}$ | $1010_{bin}$ |

As can be seen, only eleven different correction patterns are possible, and therefore they can be represented with a pattern codeword of four bits, for instance with the bit patterns specified in the right column of Table IV. FIG. 18M illustrates the correction pattern $0001000_{bin}$, which is represented by the bit pattern $0110_{bin}$.

The invention claimed is:

1. A method, performed by computational hardware operatively connected to memory, of compressing a block of pixels having associated pixel parameter values, comprising:
   determining a reference codeword as a representation of a reference pixel parameter value;
   determining a row slope codeword as a representation of a basic parameter slope for the rows of said block;
   determining a column slope codeword as a representation of a basic parameter slope for the columns of said block;
   generating, for a row or a column in said block and based on at least a portion of said pixel parameter values of said row or said column, a representation indicating pixel positions where a slope change occurs along said at least a portion of said row or said column;
   repeating said generating for at least a portion of said rows or said columns in said block;
   determining a mode codeword as a representation of a set of multiple slope correction patterns, each slope correction pattern comprising a specific, predefined representation indicating position-dependent slope correctors applicable along a row or column;
   determining, for said at least one row or column in said block, a pattern codeword as a representation of a slope correction pattern of said set based on said position-indicating representation generated for said row or said column; and
   storing a compressed pixel block in the memory, the compressed pixel block including the reference codeword, the row slope codeword, the column slope codeword, the mode codeword, and the pattern codeword.

2. The method according to claim 1, wherein determining a mode codeword is performed at least partly based on said generated position-indicating representations.

3. The method according to claim 1, wherein said generating further comprises:
   optionally quantizing the parameter values of said row or said column; and
   subtracting, for each pixel in said at least a portion of said row or said column, quantized parameter value of a preceding pixel in said row or column or said reference parameter value and said basic parameter slope for said rows or said columns from a quantized parameter value of said pixel.

4. The method according to claim 1, wherein determining a mode codeword comprises:
   selecting a set of slope correction patterns from multiple predefined sets; and
   determining said mode codeword based on said selected set.

5. The method according to claim 4, wherein said row slope codeword is a representation of an integer portion of the parameter slope for said rows of said block and said column slope codeword is a representation of an integer portion of the parameter slope for said columns of said block, and wherein each set of said multiple predefined sets is associated with a range of fraction portions of the parameter slope for said rows or said columns of said block.

6. The method according to claim 1, wherein said generating further comprises:
   generating, for said row or said column and based on a first portion of said pixel parameter values of said row or said column, a first representation indicating pixel positions where a slope change occurs along said first portion of said row or said column; and generating, for said row or said column and based on a second portion of said pixel parameter values of said row or said column, a second representation indicating pixel positions where a slope change occurs along said second portion of said row or said column.

7. The method according to claim 6, wherein determining a mode codeword comprises determining, based on said generated first and second position-indicating representation, a mode codeword as a representation of a set of multiple slope correction patterns.

8. The method according to claim 7, wherein said pattern codeword determining further comprises:
    determining, for at least one row or column in said block, a first pattern codeword as a representation of a first slope correction pattern of said set based on said first position-indicating representation generated for said row or said column; and
    determining, for said at least one row or column in said block, a second pattern codeword as a representation of a second slope correction pattern of said set based on said second position-indicating representation generated for said row or said column.

9. The method according to claim 6, wherein said mode codeword determining further comprises:
    determining, based on said generated first position-indicating representations, a first mode codeword as a representation of a first set of multiple slope correction patterns; and
    determining, based on said generated second position-indicating representations, a second mode codeword as a representation of a second set of multiple slope correction patterns.

10. The method according to claim 9, wherein said pattern codeword determining further comprises:
    determining, for at least one row or column in said block, a first pattern codeword as a representation of a first slope correction pattern of said first set based on said first position-indicating representation generated for said row or said column; and
    determining, for said at least one row or column in said block, a second pattern codeword as a representation of a second slope correction pattern of said second set based on said second position-indicating representation generated for said row or said column.

11. A method, performed by computational hardware operatively connected to memory, of decompressing a pixel from a compressed pixel block, comprising:
    generating a reference pixel parameter value based on a reference codeword of said compressed pixel block;
    generating a basic parameter slope based on a slope codeword of said compressed pixel block;
    providing a set of multiple slope correction patterns based on a mode codeword of said compressed pixel block, each slope correction pattern comprising a specific, predefined representation indicating position-dependent slope correctors applicable along a row or a column;
    selecting a slope correction pattern from said provided set based on a pattern codeword associated with said pixel and included in said compressed pixel block; and
    determining a decompressed pixel parameter value of said pixel based on said reference pixel parameter value, said basic parameter slope and said selected slope correction pattern.

12. The method according to claim 11, wherein determining a decompressed pixel parameter value of said pixel comprises adding said basic parameter slope and a slope corrector selected from said slope correction pattern to a pixel parameter value determined for a previous pixel in said row or said column or to said reference pixel parameter value.

13. The method according to claim 12, further comprising selecting said slope corrector based on a position of said pixel in said row or said column.

14. The method according to claim 11, wherein generating a basic parameter slope comprises:
    generating a basic parameter slope for the rows of said pixel block based on a row slope codeword of said compressed pixel block; and
    generating a basic parameter slope for the columns of said pixel block based on a column slope codeword of said compressed pixel block.

15. The method according to claim 14, wherein determining a decompressed pixel parameter value comprises determining said decompressed pixel value based on said reference pixel parameter value, said basic parameter slope for said rows, said basic parameter slope for said columns, said selected slope correction pattern and at least one slope modifier of said compressed pixel block.

16. The method according to claim 15, wherein determining a decompressed pixel parameter value further comprises:
    adding said basic parameter slope for said columns and said at least one slope modifier to a pixel parameter value determined for a previous pixel in said column to form an intermediate value; and
    adding said basic parameter slope for said rows and a slope corrector selected from said slope correction pattern to a pixel parameter value determined for a previous pixel in said row or to said intermediate value.

17. The method according to claim 15, wherein determining a decompressed pixel parameter value further comprises:
    adding said basic parameter slope for said rows and said at least one slope modifier to a pixel parameter value determined for a previous pixel in said row to form an intermediate value; and
    adding said basic parameter slope for said columns and a slope corrector selected from said slope correction pattern to a pixel parameter value determined for a previous pixel in said column or to said intermediate value.

18. The method according to claim 11, wherein providing a set of multiple slope correction patterns comprises providing said set from a collection of multiple predefined sets based on said mode codeword.

19. A compressor implemented by computational hardware operatively connected to memory, the compressor operative to compress a block of pixels having associated pixel parameter values, comprising:
    a reference quantizer operative to determine a reference codeword as a representation of a reference pixel parameter value;
    a row slope quantizer operative to determine a row slope codeword as a representation of a basic parameter slope for the rows of said block;
    a column slope quantizer operative to determine a column slope codeword as a representation of a basic parameter slope for the columns of said block;
    a representation generator for generating, for each row or column in at least a portion of said block and based on at least a portion of said pixel parameter values of said row or said column, a representation indicating where a slope change occurs along said at least a portion of said row or said column;
    a mode selector operative to determine a mode codeword as a representation of a set of multiple slope correction patterns, each slope correction pattern is a specific, predefined representation indicating position-dependent slope correctors applicable along a row or a column; and a pattern selector operative to determine, for said at least one row or column in said block, a pattern codeword as a representation of a slope correction pattern of said set based on said position-indicating representation generated for said row or said column;

wherein the compressor is configured to store a compressed pixel block in the memory, the compressed pixel block including the reference codeword, the row slope codeword, the column slope codeword, the mode codeword, and the pattern codeword.

20. The compressor according to claim 19, wherein said mode selector is configured to determine said mode codeword at least partly based on said generated position-indicating representations.

21. The compressor according to claim 19, further comprising:

a value quantizer operative to quantize the parameter values of said row or said column; and a calculator operative to subtract, for each pixel in said at least a portion of said row or said column, the quantized parameter value of a preceding pixel in said row or said column or said reference parameter value and said basic parameter slope for said rows or said columns from said quantized parameter value of said pixel.

22. The compressor according to claim 19, wherein said representation generator is configured to:

generate, for said row or said column and based on a first portion of said pixel parameter values of said row or said column, a first representation indicating pixel positions where a slope change occurs along said first portion of said row or said column; and generate, for said row or said column and based on a second portion of said pixel parameter values of said row or said column, a second representation indicating pixel positions where a slope change occurs along said second portion of said row or said column.

23. The compressor according to claim 22, wherein said mode selector is configured to determine, based on said generated first and second position-indicating representations, a mode codeword as a representation of a set of multiple slope correction patterns.

24. The compressor according to claim 22, wherein said pattern selector is configured to:

determine, for at least one row or column in said block, a first pattern codeword as a representation of a first slope correction pattern of said set based on said first position-indicating representation generated for said row or said column; and determine, for said at least one row or column in said block, a second pattern codeword as a representation of a second slope correction pattern of said set based on said second position-indicating representation generated for said row or said column.

25. The compressor according to claim 24, wherein said mode selector is configured to:

determine, based on said generated first position-indicating representations, a first mode codeword as a representation of a first set of multiple slope correction patterns; and determine, based on said generated second position-indicating representations, a second mode codeword as a representation of a second set of multiple slope correction patterns.

26. The compressor according to claim 25, wherein said pattern selector is configured to:

determine, for at least one row or column in said block, a first pattern codeword as a representation of a first slope correction pattern of said first set based on said first position-indicating representation generated for said row or said column; and determine, for said at least one row or column in said block, a second pattern codeword as a representation of a second slope correction pattern of said second set based on said second position-indicating representation generated for said row or said column.

27. A decompressor implemented by computational hardware operatively connected to memory, the decompressor operative to decompress a pixel from a compressed pixel block, comprising:

a reference generator operative to generate a reference pixel parameter value based on a reference codeword of said compressed pixel block;

a slope generator operative to generate a basic parameter slope based on a slope codeword of said compressed pixel block;

a set provider operative to provide a set of multiple slope correction patterns based on a mode codeword of said compressed pixel block, each slope correction pattern comprising a specific, predefined representation indicating position-dependent slope correctors applicable along a row or a column;

a pattern selector operative to select a slope correction pattern from said provided set based on a pattern codeword associated with said pixel and included in said compressed pixel block; and a value determiner operative to determine a decompressed pixel parameter value of said pixel based on said reference pixel parameter value, said basic parameter slope and said selected slope correction pattern.

28. The decompressor according to claim 27, wherein said value determiner is configured to add said basic parameter slope and a slope corrector selected from said slope correction pattern to a pixel parameter value determined for a previous pixel in said row or said column or to said reference pixel parameter value.

29. The decompressor according to claim 28, further comprising a modifier selector operative to select said slope corrector based on a position of said pixel in said row or said column.

30. The decompressor according to claim 27, wherein said slope generator is configured to:

generate a basic parameter slope for the rows of said pixel block based on a row slope codeword of said compressed pixel block; and generate a basic parameter slope for the columns of said pixel block based on a column slope codeword of said compressed pixel block.

31. The decompressor according to claim 30, wherein said value determiner is configured to determine said decompressed pixel parameter value based on said reference pixel parameter value, said basic parameter slope for said rows, said basic parameter slope for said columns, said selected slope correction pattern and at least one slope modifier of said compressed pixel block.

32. A method, performed by computational hardware operatively connected to memory, of compressing a block of M×N pixels having associated pixel parameter values, comprising:

determining a reference codeword as a representation of a reference pixel parameter value;

determining a row slope codeword as a representation of a basic parameter slope for the rows of said block;

determining a column slope codeword as a representation of a basic parameter slope for the columns of said block; and determining a modifier codeword as a representation of multiple slope modifiers applicable to at least one of said basic parameter slope for said rows and said basic parameter slope for said columns, wherein said modifier codeword comprising fewer than M×N−1 bits; and storing a compressed pixel block in the memory, the compressed pixel block including the reference codeword, the row slope codeword, the column slope codeword, and the modifier codeword.

33. A computer readable medium storing a compressed representation of a block of pixels having associated pixel parameter values, the compressed representation being readable by computational hardware to determine the associated pixel parameter values while requiring less memory to store than the block of pixels and associated pixel parameter values, the representation comprising:

a reference codeword representing a reference pixel parameter value;

a row slope codeword representing a basic parameter slope for the rows of said block;

a column slope codeword representing a basic parameter slope for the columns of said block;

a mode codeword representing a set of multiple slope correction patterns, each slope correction pattern being a specific, predefined representation indicating position dependent slope correctors applicable along a row or a column; and a pattern codeword, for each row or column of said block, representing a slope correction pattern of said set.

* * * * *